US010011271B2

(12) United States Patent
Takagi et al.

(10) Patent No.: US 10,011,271 B2
(45) Date of Patent: Jul. 3, 2018

(54) HYBRID VEHICLE

(71) Applicant: TOYOTA JIDOSHA KABUSHIKI KAISHA, Toyota-shi, Aichi-ken (JP)

(72) Inventors: Kiyonori Takagi, Okazaki (JP); Hidehiko Banshoya, Toyota (JP); Atsushi Kawamoto, Toyota (JP); Haruhisa Suzuki, Nagoya (JP); Tatsuya Imamura, Okazaki (JP); Toshiki Kanada, Anjo (JP); Atsushi Tabata, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/549,646

(22) PCT Filed: Feb. 16, 2016

(86) PCT No.: PCT/IB2016/000147
§ 371 (c)(1),
(2) Date: Aug. 8, 2017

(87) PCT Pub. No.: WO2016/132208
PCT Pub. Date: Aug. 25, 2016

(65) Prior Publication Data
US 2018/0022342 A1    Jan. 25, 2018

(30) Foreign Application Priority Data
Feb. 18, 2015 (JP) ................. 2015-029433

(51) Int. Cl.
*B60W 10/06* (2006.01)
*B60W 20/20* (2016.01)
(Continued)

(52) U.S. Cl.
CPC ............. *B60W 20/20* (2013.01); *B60K 6/387* (2013.01); *B60K 6/442* (2013.01); *B60K 6/445* (2013.01);
(Continued)

(58) Field of Classification Search
CPC ...... B60W 20/20; B60W 20/40; B60W 10/08; B60W 10/02; B60W 10/06; B60K 6/387; B60K 6/445; B60K 6/442
See application file for complete search history.

(56) References Cited

U.S. PATENT DOCUMENTS

2006/0276289 A1* 12/2006 Hirata ................... B60K 6/365
475/5
2013/0217538 A1   8/2013 Martin et al.
2015/0021110 A1   1/2015 Ono et al.

FOREIGN PATENT DOCUMENTS

DE   10 2008 053 505 A1   4/2010
EP       1 728 666 A1   12/2006
(Continued)

*Primary Examiner* — John D Walters
*Assistant Examiner* — James J Triggs
(74) *Attorney, Agent, or Firm* — Oliff PLC

(57) ABSTRACT

A control process including the following steps is executed. The control process includes, at the time of switching from series-parallel mode to series mode, a step of reducing an engine torque, a step of releasing a clutch, a step of reducing a reaction torque of a first rotary electric machine and a step of increasing a torque of a second rotary electric machine, and, when synchronization is started and a step of increasing a positive torque of the first MG, a step of starting engagement of a clutch, and, when a rotation speed of the first rotary electric machine and a rotation speed of an engine are synchronous with each other, a step of engaging the clutch.

4 Claims, 20 Drawing Sheets

(51) Int. Cl.

| | | |
|---|---|---|
| *B60W 10/08* | (2006.01) | |
| *B60W 20/40* | (2016.01) | |
| *B60K 6/387* | (2007.10) | |
| *B60K 6/442* | (2007.10) | |
| *B60K 6/445* | (2007.10) | |
| *B60W 10/02* | (2006.01) | |
| B60K 6/365 | (2007.10) | |
| F16H 3/72 | (2006.01) | |
| B60K 6/543 | (2007.10) | |

(52) U.S. Cl.
CPC ............ *B60W 10/02* (2013.01); *B60W 10/06* (2013.01); *B60W 10/08* (2013.01); *B60W 20/40* (2013.01); *B60K 6/365* (2013.01); *B60K 6/543* (2013.01); *B60W 2710/021* (2013.01); *B60W 2710/0666* (2013.01); *B60Y 2300/182* (2013.01); *B60Y 2300/42* (2013.01); *B60Y 2300/80* (2013.01); *F16H 3/728* (2013.01); *F16H 2200/2007* (2013.01); *Y10S 903/911* (2013.01); *Y10S 903/918* (2013.01); *Y10S 903/93* (2013.01)

(56) References Cited

FOREIGN PATENT DOCUMENTS

| | | |
|---|---|---|
| JP | 2005-297786 A | 10/2005 |
| JP | 2006-335294 A | 12/2006 |
| JP | 2013-241128 A | 12/2013 |
| WO | 2013/114594 A1 | 8/2013 |

* cited by examiner

FIG. 5

| | | TRAVELING STATE | | | C1 | B1 | CS | MG1 | MG2 |
|---|---|---|---|---|---|---|---|---|---|
| E1 | EV MODE | FORWARD /REVERSE | ONE-MOTOR | DURING DRIVING | × | × | × | | M |
| E2 | | | | DURING ENGINE BRAKE | △ | △ | × | | G |
| E3 | | | TWO-MOTOR | Ne=0 | ○ | ○ | × | M | M |
| H1 | HV MODE | SERIES-PARALLEL MODE | FORWARD | HIGH GEAR | × | ○ | × | G | M |
| H2 | | | | LOW GEAR | ○ | × | × | G | M |
| H3 | | | REVERSE | LOW GEAR | ○ | × | × | G | M |
| H4 | | SERIES MODE | FORWARD | | × | × | ○ | G | M |
| H5 | | | REVERSE | | × | × | ○ | G | M |

○: ENGAGED   △: ANY ONE IS ENGAGED WHILE USING ENGINE BRAKE IN COMBINATION   ×: RELEASED
G: MAINLY GENERATOR   M: MAINLY MOTOR; HOWEVER, GENERATOR DURING REGENERATION

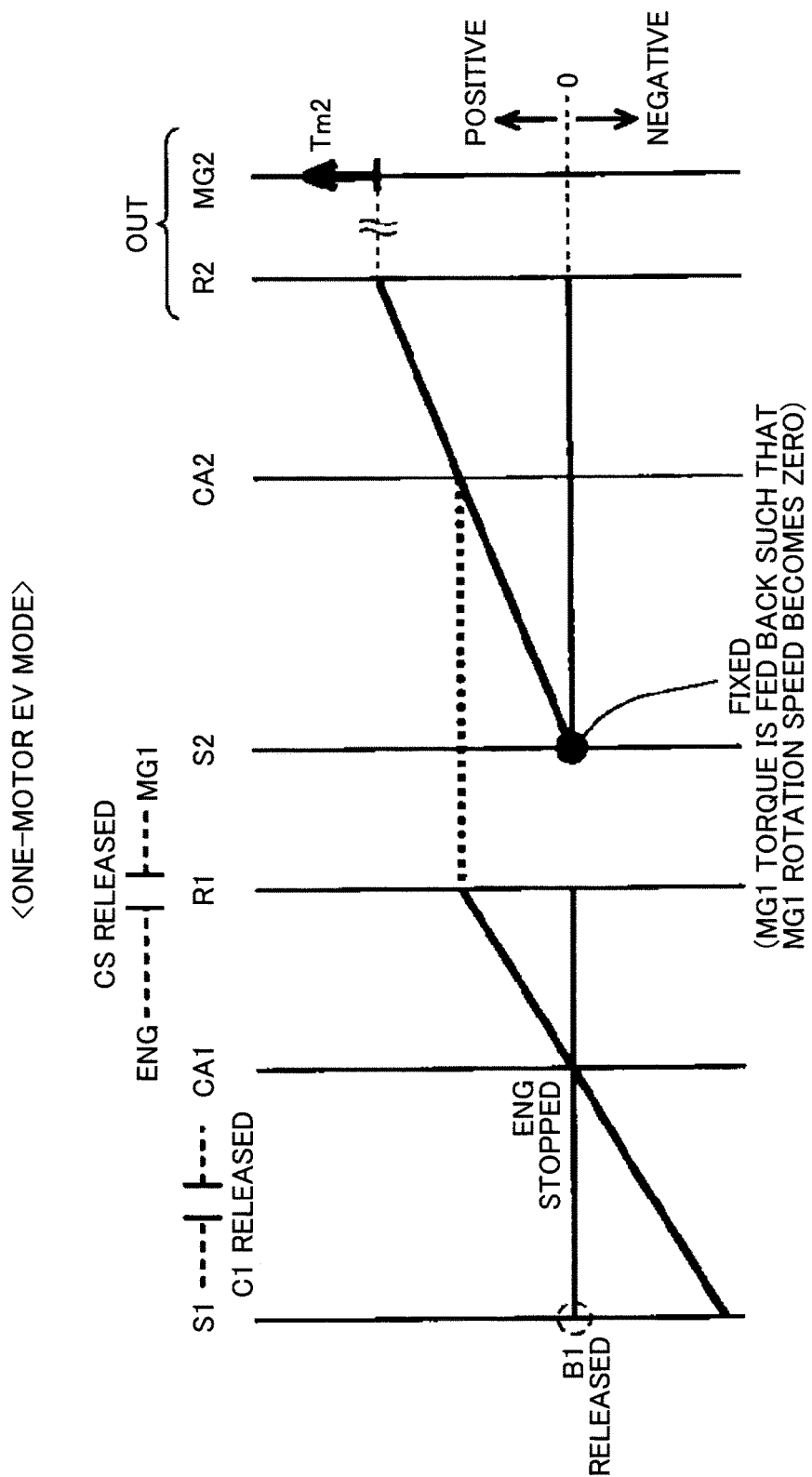

<ALTERNATIVE EMBODIMENT>

FIG. 16

<ALTERNATIVE EMBODIMENT>

| | | TRAVELING STATE | | C1 | B1 | CS | MG1 | MG2 |
|---|---|---|---|---|---|---|---|---|
| E1 | EV MODE | ONE-MOTOR FORWARD/REVERSE | DURING DRIVING | × | × | × | | M |
| E2 | | | DURING ENGINE BRAKE | △ | △ | × | M | G |
| E3 | | TWO-MOTOR | Ne=0 | ○ | ○ | × | M | M |
| E4 | | | Ne FREE | HIGH GEAR | × | ○ | ○ | M | M |
| E5 | | | | LOW GEAR | ○ | × | ○ | M | M |
| H1 | HV MODE | SERIES-PARALLEL MODE FORWARD | STEPLESS | HIGH GEAR | × | ○ | × | G | M |
| H2 | | | | LOW GEAR | ○ | × | × | G | M |
| H6 | | PARALLEL MODE FORWARD | STEPPED | HIGH GEAR | ONE-MOTOR | × | ○ | ○ | | M |
| H7 | | | | | TWO-MOTOR | × | ○ | ○ | M | M |
| H8 | | | | LOW GEAR | ONE-MOTOR | ○ | × | ○ | | M |
| H9 | | | | | TWO-MOTOR | ○ | × | ○ | M | M |
| H3 | | SERIES-PARALLEL MODE REVERSE | LOW GEAR | ○ | × | × | M | M |
| H4 | | SERIES MODE FORWARD | | × | × | ○ | G | M |
| H5 | | | REVERSE | × | × | ○ | G | M |

○: ENGAGED  △: ANY ONE IS ENGAGED WHILE USING ENGINE BRAKE IN COMBINATION  ×: RELEASED
G: MAINLY GENERATOR
M: MAINLY MOTOR; HOWEVER, GENERATOR DURING REGENERATION

FIG. 19 <FIRST ALTERNATIVE EMBODIMENT OF GEAR MECHANISM>

<SECOND ALTERNATIVE EMBODIMENT OF GEAR MECHANISM>

HYBRID VEHICLE

BACKGROUND OF THE INVENTION

1. Field of the Invention

The invention relates to a hybrid vehicle and, more particularly, to a hybrid vehicle including first and second rotary electric machines and a transmission unit.

2. Description of Related Art

There is known a hybrid vehicle including not only an engine, two rotary electric machines and a power split mechanism but also a transmission mechanism between the engine and the power split mechanism.

A hybrid vehicle described in International Application Publication No. 2013/114594 employs a series-parallel hybrid system. In the vehicle having a series-parallel hybrid system, the power of an engine is transmitted to a first rotary electric machine (first motor generator) and is used to generate electric power, while part of the power of the engine is also transmitted to drive wheels via a power split mechanism.

There is also known a hybrid vehicle having a configuration (series hybrid system) by which the hybrid vehicle generates electric power by the use of the power of an engine and travels in series mode in which a motor is driven by the generated electric power. In this series hybrid system, the power of the engine is not transmitted to drive wheels.

The hybrid vehicle described in International Application Publication No. 2013/114594 is not able to travel in series mode because the power of the engine is also transmitted to the drive wheels via the power split mechanism at the time when the power of the engine is transmitted to the first motor generator.

In the series-parallel hybrid system, there is a concern that tooth contact noise occurs in a gear mechanism provided in a drive system between the engine and the drive wheels because of torque fluctuations of the engine at a low vehicle speed, or the like, so it is required to select an operating point of the engine such that tooth contact noise does not occur, and the engine may be operated at an operating point at which fuel consumption is not optimal. Therefore, there is room for improvement in fuel consumption.

On the other hand, in the series hybrid system, the engine is completely isolated from a gear mechanism provided in a drive system, so such tooth contact noise does not need to be considered so much. However, the entire torque of the engine is once converted to electric power and then the electric power is converted back to the torque of the drive wheels with the motor, so the series hybrid system is inferior in fuel consumption in a speed range in which the operation efficiency of the engine is high to the series-parallel hybrid system.

In this way, there is a point in which the series hybrid system is superior to the series-parallel hybrid system and there is also a point in which the series-parallel hybrid system is superior to the series hybrid system, so it is desirable to be configured to allow one of the series mode and the series-parallel mode to be selected in response to the condition of a vehicle.

Incidentally, when switching from the series-parallel mode to the series mode is enabled by, for example, engaging a clutch to directly couple the first motor generator to the engine, a power transmission state changes from a state where power is transmittable between the engine and the drive wheels to a state where power is isolated between the engine and the drive wheels at the time of the switching. Therefore, the rotation speed of one of rotating elements of the clutch may not be synchronized with the rotation speed of the other one of the rotating elements of the clutch, which is an engaging target. As a result, switching to the series mode may be delayed.

SUMMARY OF THE INVENTION

The invention provides a hybrid vehicle that smoothly switches from series-parallel mode to series mode.

An aspect of the invention provides a hybrid vehicle. The hybrid vehicle includes an internal combustion engine, a first rotary electric machine, a second rotary electric machine, a power transmission unit, a differential unit, a clutch and a controller. The second rotary electric machine is configured to output power to a drive wheel. The power transmission unit includes an input element and an output element. The input element is configured to receive power from the internal combustion engine. The output element is configured to output power input to the input element. The power transmission unit is configured to switch between a non-neutral state where power is transmitted between the input element and the output element and a neutral state where power is not transmitted between the input element and the output element. The differential unit includes a first rotating element, a second rotating element and a third rotating element. The first rotating element is connected to the first rotary electric machine. The second rotating element is connected to the second rotary electric machine and the drive wheel. The third rotating element is connected to the output element. The differential unit is configured such that, when rotation speeds of any two of the first rotating element, the second rotating element and the third rotating element are determined, a rotation speed of the remaining one of the first rotating element, the second rotating element and the third rotating element is determined. The clutch is configured to switch between an engaged state where power is transmitted from the internal combustion engine to the first rotary electric machine and a released state where transmission of power from the internal combustion engine to the first rotary electric machine is interrupted. Power from the internal combustion engine is transmitted to the first rotary electric machine though at least one of a first path or a second path. The first path is a path through which power is transmitted from the internal combustion engine to the first rotary electric machine via the power transmission unit and the differential unit, and the second path is a path through which power is transmitted from the internal combustion engine to the first rotary electric machine via a path different from the first path. The clutch is provided in the second path. The controller is configured to, at the time of switching from series-parallel mode to series mode, after starting to control the power transmission unit such that the power transmission unit is placed in the neutral state, control the first rotary electric machine such that a first rotation speed of the first rotary electric machine and a second rotation speed of the internal combustion engine are synchronous with each other. The series-parallel mode is a mode in which the clutch is in the released state and the power transmission unit is in the non-neutral state. The series mode is a mode in which the clutch is in the engaged state and the power transmission unit is in the neutral state.

With the thus configured hybrid vehicle, at the time of switching from the series-parallel mode to the series mode, after starting to control the power transmission unit such that the power transmission unit is placed in the neutral state, the first rotary electric machine is controlled such that the first rotation speed and the second rotation speed are synchronous with each other. Therefore, it is possible to switch the clutch into the engaged state in a state where the first rotation speed and the second rotation speed are synchronous with each other. Therefore, it is possible to smoothly switch from the series-parallel mode to the series mode.

In the hybrid vehicle, the controller may be configured to, by the time the clutch is placed in the engaged state, control at least any one of the first rotary electric machine and the second rotary electric machine such that torque fluctuations that occur as a result of placing the clutch in the engaged state reduce.

With the thus configured hybrid vehicle, it is possible to suppress transmission of a shock due to placing the clutch in the engaged state to the drive wheel via the differential unit. Therefore, it is possible to suppress occurrence of a shock in the vehicle at the time of switching from the series-parallel mode to the series mode.

The controller may be configured to control the clutch such that the clutch switches from the released state to the engaged state after synchronization of the first rotation speed with the second rotation speed has completed.

With the thus configured hybrid vehicle, because it is possible to switch the clutch into the engaged state after synchronization of the first rotation speed with the second rotation speed has completed, it is possible to smoothly switch from the series-parallel mode to the series mode.

The controller may be configured to, at the time of switching from the series-parallel mode to the series mode, place the power transmission unit in the neutral state, and reduce an output torque of the internal combustion engine. With the thus configured hybrid vehicle, it is possible to suppress an unnecessary increase in the rotation speed of the internal combustion engine.

With the above-described hybrid vehicle, at the time of switching from the series-parallel mode to the series mode, after the power transmission unit is controlled such that the power transmission unit is placed in the neutral state, the first rotary electric machine is controlled such that the first rotation speed and the second rotation speed are synchronous with each other. Therefore, it is possible to switch the clutch into the engaged state in a state where the first rotation speed and the second rotation speed are synchronous with each other. Therefore, it is possible to provide the hybrid vehicle that smoothly switches from the series-parallel mode to the series mode.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5 is a chart that shows each drive mode in the hybrid vehicle and controlled statuses of clutches and brake of a transmission unit in each drive mode;

FIG. 6 is a nomograph in one-motor EV mode that is one of the drive modes shown in FIG. 5;

FIG. 16 is a chart that shows controlled statuses of the clutches and brake of the transmission unit in each drive mode according to a further another alternative embodiment to the embodiment;

DETAILED DESCRIPTION OF EMBODIMENTS

Figure 1:
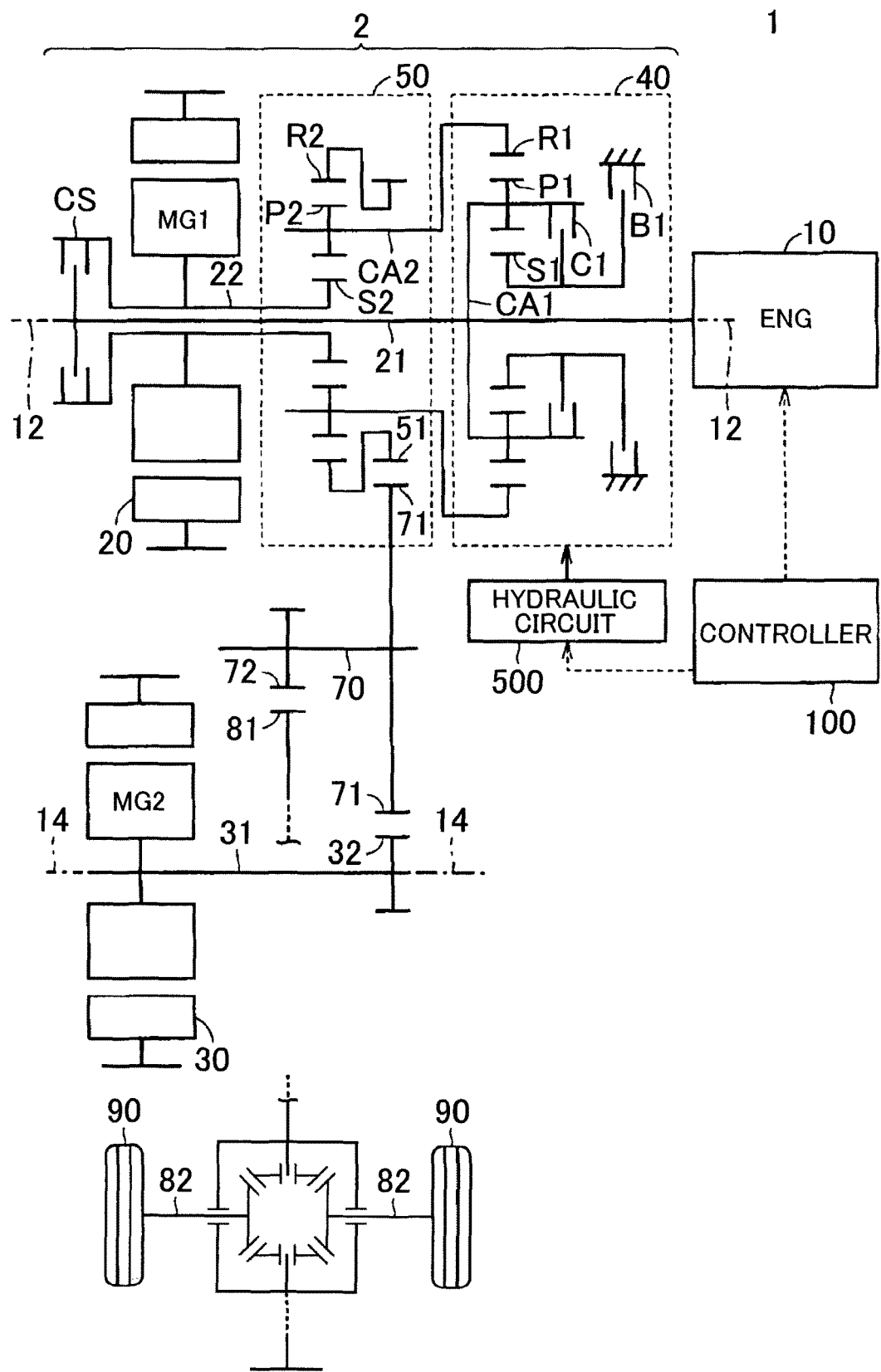
FIG. 1 is a view that shows the overall configuration of a hybrid vehicle including a drive system according to an embodiment of the invention.

Hereinafter, an embodiment of the invention will be described with reference to the accompanying drawings. Like reference numerals denote the same or corresponding portions in the following embodiment, and the description thereof will not be repeated.

FIG. 1 is a view that shows the overall configuration of a hybrid vehicle including a drive system according to the embodiment of the invention.

As shown in FIG. 1, the hybrid vehicle 1 (hereinafter, also referred to as vehicle 1) includes an engine 10, the drive system 2, drive wheels 90 and a controller 100. The drive system 2 includes a first motor generator (hereinafter, referred to as first MG) 20 that is a first rotary electric machine, a second motor generator (hereinafter, referred to as second MG) 30 that is a second rotary electric machine, a transmission unit 40, a differential unit 50, a clutch CS, an input shaft 21, a counter shaft 70 that is an output shaft of the drive system 2, a differential gear set 80 and a hydraulic circuit 500.

The hybrid vehicle 1 is a front-engine front-drive (FF) hybrid vehicle that travels by using the power of at least any one of the engine 10, the first MG 20 and the second MG 30. The hybrid vehicle 1 may be a plug-in hybrid vehicle of which an in-vehicle battery (not shown) is rechargeable from an external power supply.

The engine 10 is, for example, an internal combustion engine, such as a gasoline engine and a diesel engine. Each of the first MG 20 and the second MG 30 is, for example, a permanent magnet synchronous motor that includes a rotor in which permanent magnets are embedded. The drive system 2 is a double-axis drive system in which the first MG 20 is provided along a first axis 12 coaxial with the crankshaft of the engine 10 and the second MG 30 is provided along a second axis 14 different from the first axis 12. The first axis 12 and the second axis 14 are parallel to each other.

The transmission unit 40, the differential unit 50 and the clutch CS are further provided along the first axis 12. The transmission unit 40, the differential unit 50, the first MG 20 and the clutch CS are arranged from the side close to the engine 10 in the stated order.

The first MG 20 is provided so as to be able to receive power from the engine 10. More specifically, the input shaft 21 of the drive system 2 is connected to the crankshaft of the engine 10. The input shaft 21 extends along the first axis 12 in a direction away from the engine 10. The input shaft 21 is connected to the clutch CS at its distal end extending from the engine 10. A rotary shaft 22 of the first MG 20 extends in a cylindrical shape along the first axis 12. The input shaft 21 passes through the inside of the rotary shaft 22 at a portion before the input shaft 21 is connected to the clutch CS. The input shaft 21 is connected to the rotary shaft 22 of the first MG 20 via the clutch CS.

The clutch CS is provided in a power transmission path from the engine 10 to the first MG 20. The clutch CS is a hydraulic friction engagement element that is able to couple the input shaft 21 to the rotary shaft 22 of the first MG 20. When the clutch CS is placed in an engaged state, the input shaft 21 and the rotary shaft 22 are coupled to each other, and transmission of power from the engine 10 to the first MG 20 is allowed. When the clutch CS is placed in a released state, coupling of the input shaft 21 to the rotary shaft 22 is released, and transmission of power from the engine 10 to the first MG 20 via the clutch CS is interrupted.

The transmission unit 40 shifts power from the engine 10 and then outputs the power to the differential unit 50. The transmission unit 40 includes a single-pinion-type planetary gear mechanism, a clutch C1 and a brake B1. The single-pinion-type planetary gear mechanism includes a sun gear S1, pinions P1, a ring gear R1 and a carrier CA1.

The sun gear S1 is provided such that the rotation center of the sun gear S1 coincides with the first axis 12. The ring gear R1 is provided coaxially with the sun gear S1 on the radially outer side of the sun gear S1. The pinions P1 are arranged between the sun gear S1 and the ring gear R1, and are in mesh with the sun gear S1 and the ring gear R1. The pinions P1 are rotatably supported by the carrier CA1. The carrier CA1 is connected to the input shaft 21, and rotates integrally with the input shaft 21. Each of the pinions P1 is provided so as to be revolvable about the first axis 12 and rotatable around the central axis of the pinion P1.

As shown in FIG. 6 to FIG. 9, FIG. 17 and FIG. 18 (described later), the rotation speed of the sun gear S1, the rotation speed of the carrier CA1 (that is, the rotation speed of the engine 10) and the rotation speed of the ring gear R1 are in the relationship represented by points that are connected by a straight line in each of the nomographs (that is, the relationship that, when any two rotation speeds are determined, the remaining one rotation speed is also determined).

In the present embodiment, the carrier CA1 is provided as an input element to which power is input from the engine 10, and the ring gear R1 is provided as an output element that outputs the power input to the carrier CA1. By the use of the planetary gear mechanism including the sun gear S1, the pinions P1, the ring gear R1 and the carrier CA1, power input to the carrier CA1 is shifted and output from the ring gear R1.

The clutch C1 is a hydraulic friction engagement element that is able to couple the sun gear S1 to the carrier CA1. When the clutch C1 is placed in an engaged state, the sun gear S1 and the carrier CA1 are coupled to each other, and rotate integrally with each other. When the clutch C1 is placed in a released state, integral rotation of the sun gear S1 and the carrier CA1 is cancelled.

The brake B1 is a hydraulic friction engagement element that is able to restrict (lock) the rotation of the sun gear S1. When the brake B1 is placed in an engaged state, the sun gear S1 is fixed to the case body of the drive system, and the rotation of the sun gear S1 is restricted. When the brake B1 is placed in a released state (disengaged state), the sun gear S1 is separated from the case body of the drive system, and the rotation of the sun gear S1 is allowed.

A speed ratio (the ratio of the rotation speed of the carrier CA1 that is the input element to the rotation speed of the ring gear R1 that is the output element, specifically, Rotation Speed of Carrier CA1/Rotation Speed of Ring Gear R1) of the transmission unit 40 is changed in response to a combination of the engaged/released states of the clutch C1 and brake B1. When the clutch C1 is engaged and the brake B1 is released, a low gear position Lo in which the speed ratio is 1.0 (directly coupled state) is established. When the clutch C1 is released and the brake B1 is engaged, a high gear position Hi in which the speed ratio is smaller than 1.0 (for example, 0.7, and a so-called over-drive state) is established. When the clutch C1 is engaged and the brake B1 is engaged, the rotation of the sun gear S1 and the rotation of the carrier CA1 are restricted, so the rotation of the ring gear R1 is also restricted.

The transmission unit 40 is configured to be able to switch between a non-neutral state and a neutral state. In the non-neutral state, power is transmitted. In the neutral state, power is not transmitted. In the present embodiment, the above-described directly coupled state and over-drive state correspond to the non-neutral state. On the other hand, when both the clutch C1 and the brake B1 are released, the carrier CA1 is allowed to coast about the first axis 12. Thus, the neutral state in which power transmitted from the engine 10 to the carrier CA1 is not transmitted from the carrier CA1 to the ring gear R1 is obtained.

The differential unit 50 includes a single-pinion-type planetary gear mechanism and a counter drive gear 51. The single-pinion-type planetary gear mechanism includes a sun gear S2, pinions P2, a ring gear R2 and a carrier CA2.

The sun gear S2 is provided such that the rotation center of the sun gear S2 coincides with the first axis 12. The ring gear R2 is provided coaxially with the sun gear S2 on the radially outer side of the sun gear S2. The pinions P2 are arranged between the sun gear S2 and the ring gear R2, and are in mesh with the sun gear S2 and the ring gear R2. The pinions P2 are rotatably supported by the carrier CA2. The carrier CA2 is connected to the ring gear R1 of the transmission unit 40, and rotates integrally with the ring gear R1.

Each of the pinions P2 is provided so as to be revolvable about the first axis 12 and rotatable around the central axis of the pinion P2.

The rotary shaft 22 of the first MG 20 is connected to the sun gear S2. The rotary shaft 22 of the first MG 20 rotates integrally with the sun gear S2. The counter drive gear 51 is connected to the ring gear R2. The counter drive gear 51 is an output gear of the differential unit 50. The output gear rotates integrally with the ring gear R2.

As shown in FIG. 6 to FIG. 9, FIG. 17 and FIG. 18, the rotation speed of the sun gear S2 (that is, the rotation speed of the first MG 20), the rotation speed of the carrier CA2 and the rotation speed of the ring gear R2 are in the relationship represented by points that are connected by a straight line in each of the nomographs (that is, the relationship that, when any two rotation speeds are determined, the remaining one rotation speed is also determined). Therefore, when the rotation speed of the carrier CA2 is a predetermined value, it is possible to steplessly change the rotation speed of the ring gear R2 by adjusting the rotation speed of the first MG 20.

In the present embodiment, the case where the differential unit 50 is formed of the planetary gear mechanism is described. However, the differential unit 50 is not limited to this configuration. Any configuration of the differential unit 50 is applicable as long as the differential unit 50 is configured such that, when the rotation speeds of any two of three rotating elements is determined, the rotation speed of the remaining one of the three rotating elements is determined. For example, the differential unit 50 may have a gear structure similar to a differential gear set.

The counter shaft 70 extends parallel to the first axis 12 and the second axis 14. The counter shaft 70 is arranged parallel to the rotary shaft 22 of the first MG 20 and a rotary shaft 31 of the second MG 30. A driven gear 71 and a drive gear 72 are provided on the counter shaft 70. The driven gear 71 is in mesh with the counter drive gear 51 of the differential unit 50. That is, the power of the engine 10 and the power of the first MG 20 are transmitted to the counter shaft 70 via the counter drive gear 51 of the differential unit 50.

The transmission unit 40 and the differential unit 50 are connected in series with each other in a power transmission path from the engine 10 to the counter shaft 70. Therefore, power from the engine 10 is shifted in the transmission unit 40 and the differential unit 50 and then transmitted to the counter shaft 70.

The driven gear 71 is in mesh with a reduction gear 32 connected to the rotary shaft 31 of the second MG 30. That is, the power of the second MG 30 is transmitted to the counter shaft 70 via the reduction gear 32.

The drive gear 72 is in mesh with a differential ring gear 81 of the differential gear set 80. The differential gear set 80 is connected to the right and left drive wheels 90 via corresponding right and left drive shafts 82. That is, the rotation of the counter shaft 70 is transmitted to the right and left drive shafts 82 via the differential gear set 80.

With the above-described configuration in which the clutch CS is provided, the hybrid vehicle 1 is allowed to operate in a mode in which a series-parallel system is used (hereinafter, referred to as series-parallel mode) and is also allowed to operate in a mode in which a series system is used (hereinafter, referred to as series mode). In terms of this point, how power is transmitted from the engine in each mode will be described with reference to the schematic view shown in FIG. 2.

Figure 2:
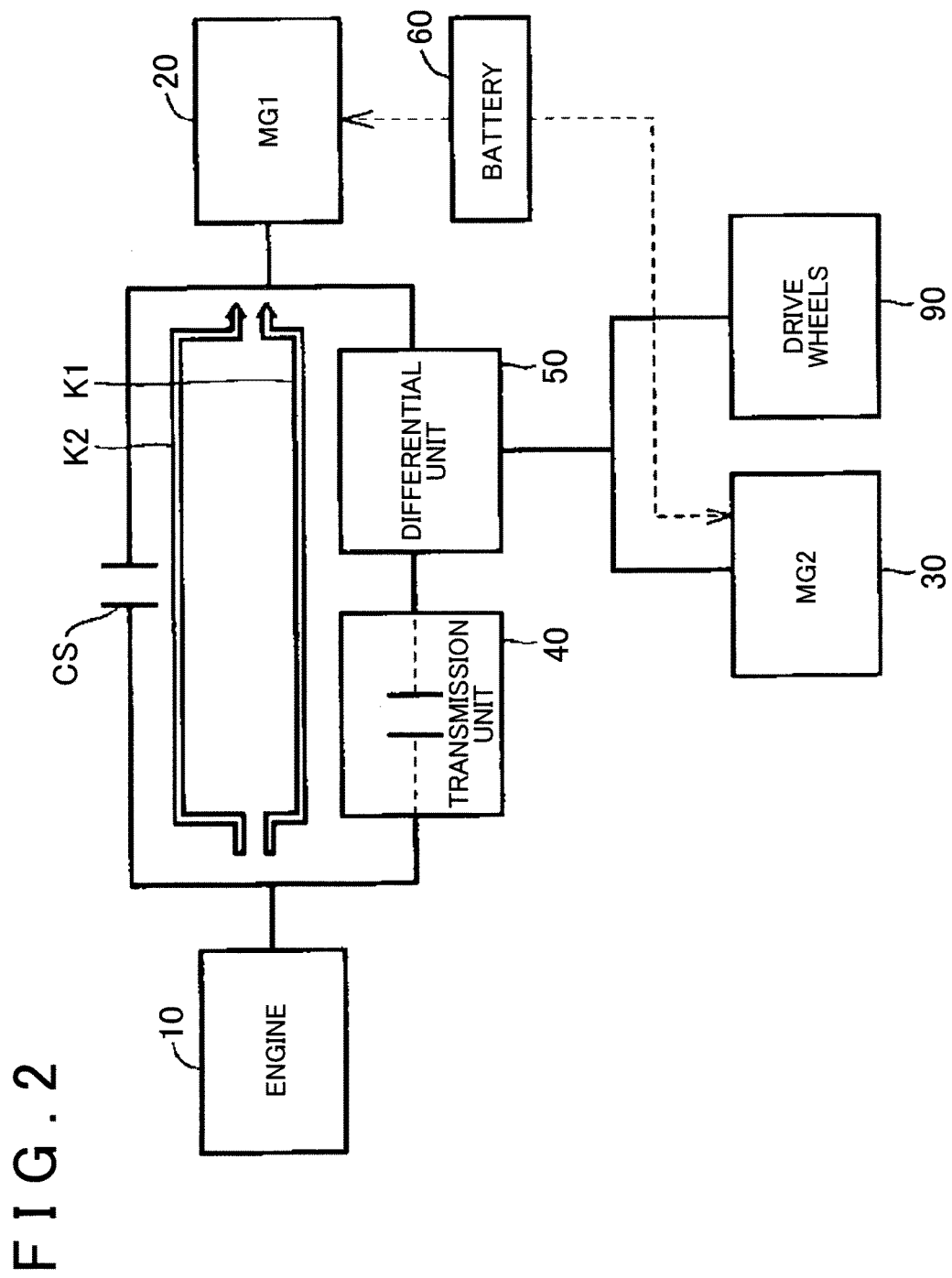
FIG. 2 is a block diagram that schematically shows power transmission paths of components of the vehicle in FIG. 1.

FIG. 2 is a block diagram that schematically shows power transmission paths of components of the vehicle in FIG. 1.

As shown in FIG. 2, the hybrid vehicle 1 includes the engine 10, the first MG 20, the second MG 30, the transmission unit 40, the differential unit 50, a battery 60 and the clutch CS.

The second MG 30 is provided so as to be able to output power to the drive wheels 90. The transmission unit 40 includes the input element and the output element. The power of the engine 10 is input to the input element. The output element outputs the power input to the input element. The transmission unit 40 is configured to be able to switch between the non-neutral state and the neutral state. In the non-neutral state, power is transmitted between the input element and the output element. In the neutral state, power is not transmitted between the input element and the output element.

The battery 60 supplies electric power to the first MG 20 or the second MG 30 during motoring of a corresponding one of the first MG 20 and the second MG 30, and stores electric power generated by the first MG 20 or the second MG 30 during regeneration of a corresponding one of the first MG 20 and the second MG 30.

The differential unit 50 includes a first rotating element, a second rotating element and a third rotating element. The first rotating element is connected to the first MG 20. The second rotating element is connected to the second MG 30 and the drive wheels 90. The third rotating element is connected to the output element of the transmission unit 40. The differential unit 50 is configured as in the case of, for example, the planetary gear mechanism, or the like, such that, when the rotation speeds of any two of the first to third rotating elements are determined, the rotation speed of the remaining one of the first to third rotating elements is determined.

The hybrid vehicle 1 is configured to be able to transmit power from the engine 10 to the first MG 20 with the use of at least any one of two paths K1, K2 through which power is transmitted. The path K1 is a path through which power is transmitted from the engine 10 to the first MG 20 via the transmission unit 40 and the differential unit 50. The path K2 is different from the path K1, and is a path through which power is transmitted from the engine 10 to the first MG 20. The clutch CS is provided in the path K2, and is able to switch between the engaged state and the released state. In the engaged state, power is transmitted from the engine 10 to the first MG 20. In the released state, transmission of power from the engine 10 to the first MG 20 is interrupted.

In HV mode in which the engine is operated, any one of the clutch C1 and the brake B1 is placed in the engaged state, and the other one of the clutch C1 and the brake B1 is placed in the released state. Thus, when the transmission unit 40 is controlled to the non-neutral state, power is transmitted from the engine 10 to the first MG 20 through the path K1. At this time, when the clutch CS is placed in the released state to interrupt the path K2 at the same time, the vehicle is operable in series-parallel mode.

On the other hand, in HV mode in which the engine is operated, when power is transmitted through the path K2 by directly coupling the engine 10 to the first MG 20 with the clutch CS and the path K1 is interrupted by controlling the transmission unit 40 such that the transmission unit 40 is placed in the neutral state by placing both the clutch C1 and the brake B1 in the released state, the vehicle is operable in series mode. At this time, in the differential unit 50, the rotating element connected to the transmission unit 40 is freely rotatable, so the other two rotating elements do not influence each other and are rotatable. Therefore, it is possible to independently perform the operation of generating electric power by rotating the first MG 20 with the use of the rotation of the engine 10 and the operation of rotating the drive wheels by driving the second MG 30 with the use of generated electric power or electric power charged in the battery 60.

The transmission unit 40 does not always need to be able to change the speed ratio. As long as it is possible to interrupt transmission of power between the engine 10 and the differential unit 50 in the path K1, a mere clutch is applicable.

Figure 3:
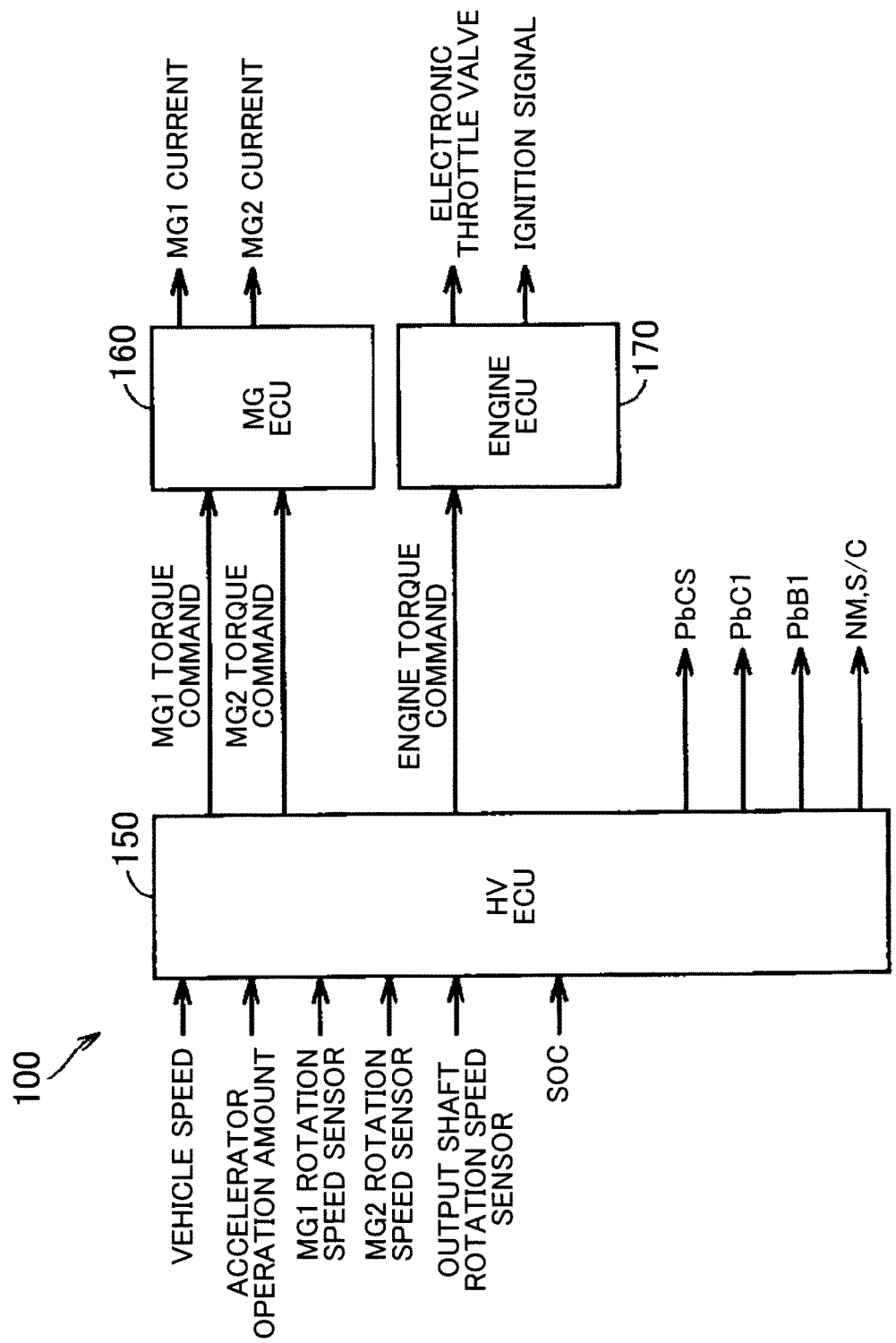
FIG. 3 is a block diagram that shows the configuration of a controller for the vehicle in FIG. 1.

FIG. 3 is a block diagram that shows the configuration of the controller 100 of the vehicle shown in FIG. 1. As shown in FIG. 3, the controller 100 includes an HV ECU 150, an MG ECU 160 and an engine ECU 170. Each of the HV ECU 150, the MG ECU 160 and the engine ECU 170 is an electronic control unit including a computer. The number of ECUs is not limited to three. An integrated single ECU may be provided as a whole, or two or four or more of split ECUs may be provided.

The MG ECU 160 controls the first MG 20 and the second MG 30. The MG ECU 160, for example, controls the output torque of the first MG 20 by adjusting the value of current that is supplied to the first MG 20, and controls the output torque of the second MG 30 by adjusting the value of current that is supplied to the second MG 30.

The engine ECU 170 controls the engine 10. The engine ECU 170, for example, controls the opening degree of an electronic throttle valve of the engine 10, controls ignition of the engine by outputting an ignition signal, or controls injection of fuel to the engine 10. The engine ECU 170 controls the output torque of the engine 10 through opening degree control over the electronic throttle valve, injection control, ignition control, and the like.

The HV ECU 150 comprehensively controls the entire vehicle. A vehicle speed sensor, an accelerator operation amount sensor, an MG1 rotation speed sensor, an MG2 rotation speed sensor, an output shaft rotation speed sensor, a battery sensor, and the like, are connected to the HV ECU 150. With these sensors, the HV ECU 150 acquires a vehicle speed, an accelerator operation amount, the rotation speed of the first MG 20, the rotation speed of the second MG 30, the rotation speed of the output shaft of a power transmission system, a battery state SOC, and the like.

The HV ECU 150 calculates a required driving force, a required power, a required torque, and the like, for the vehicle on the basis of acquired information. The HV ECU 150 determines the output torque of the first MG 20 (hereinafter, also referred to as MG1 torque), the output torque of the second MG 30 (hereinafter, also referred to as MG2 torque) and the output torque of the engine 10 (hereinafter, also referred to as engine torque) on the basis of the calculated required values. The HV ECU 150 outputs a command value of the MG1 torque and a command value of the MG2 torque to the MG ECU 160. The HV ECU 150 outputs a command value of the engine torque to the engine ECU 170.

The HV ECU 150 controls the clutches C1, CS and the brake B1 on the basis of the drive mode (described later), and the like. The HV ECU 150 outputs, to the hydraulic circuit 500 shown in FIG. 1, a command value (PbC1) of hydraulic pressure that is supplied to the clutch C1, a command value (PbCS) of hydraulic pressure that is supplied to the clutch CS and a command value (PbB1) of hydraulic pressure that is supplied to the brake B1. The HV ECU 150 outputs a control signal NM and a control signal S/C to the hydraulic circuit 500 shown in FIG. 1.

The hydraulic circuit 500 shown in FIG. 1 controls hydraulic pressures that are respectively supplied to the clutch C1 and the brake B1 in response to the command values PbC1, PbB1, controls an electric oil pump in response to the control signal NM, and controls whether to allow or prohibit simultaneous engagement of the clutch C1, the brake B1 and the clutch CS in response to the control signal S/C.

Figure 4:
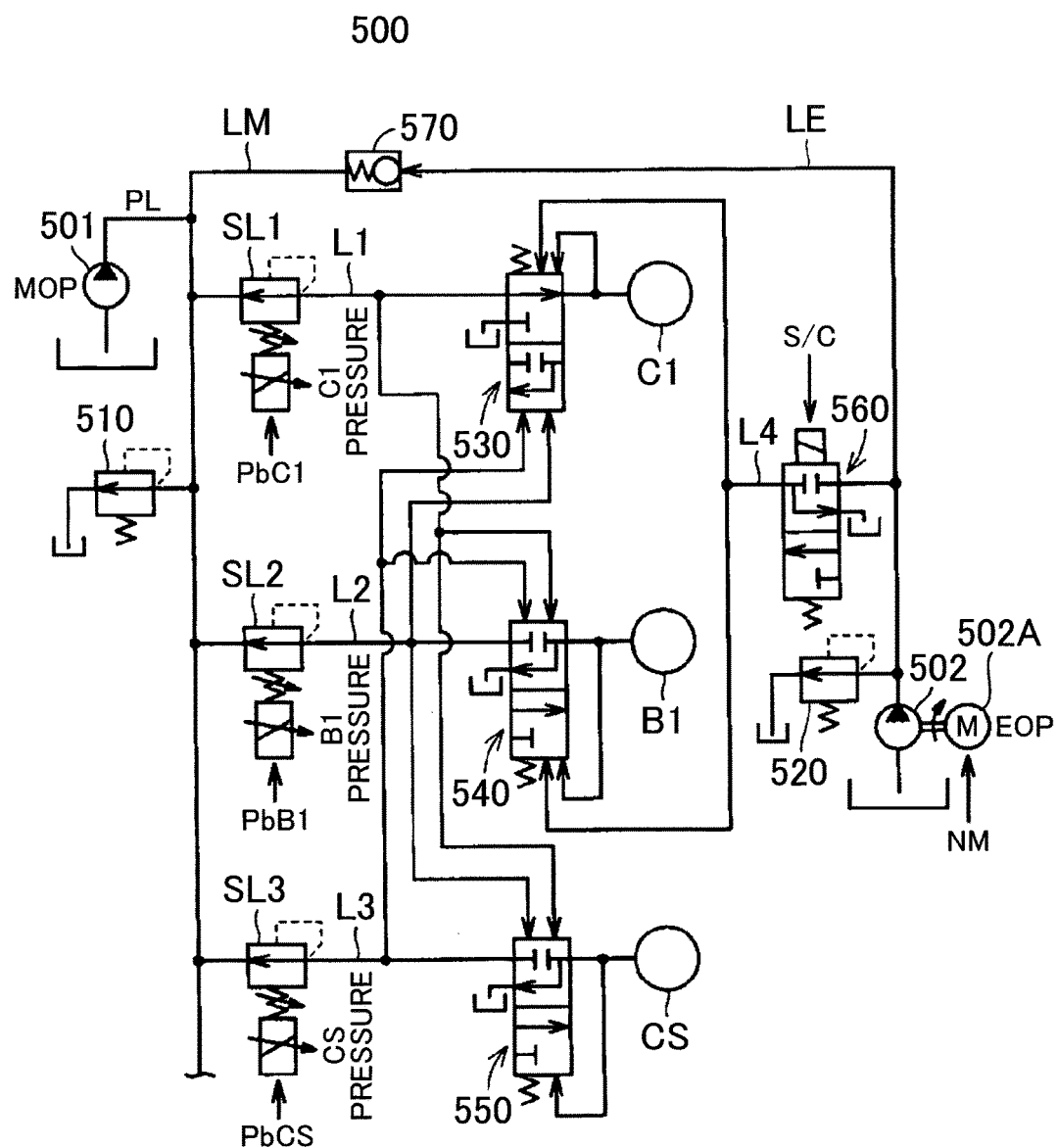
FIG. 4 is a view that schematically shows the configuration of a hydraulic circuit mounted on the hybrid vehicle shown in FIG. 1.

Next, the configuration of the hydraulic circuit will be described. FIG. 4 is a view that schematically shows the configuration of the hydraulic circuit 500 mounted on the hybrid vehicle 1. The hydraulic circuit 500 includes a mechanical oil pump (hereinafter, also referred to as MOP) 501, the electric oil pump (hereinafter, also referred to as EOP) 502, pressure regulating valves 510, 520, linear solenoid valves SL1, SL2, SL3, simultaneous supply prevention valves 530, 540, 550, an electromagnetic change-over valve 560, a check valve 570, and oil passages LM, LE, L1, L2, L3, L4.

The MOP 501 is driven by the rotation of the carrier CA2 of the differential unit 50 to generate hydraulic pressure. Therefore, when the carrier CA2 is rotated by, for example, driving the engine 10, the MOP 501 is also driven; whereas, when the carrier CA2 is stopped, the MOP 501 is also stopped. The MOP 501 outputs generated hydraulic pressure to the oil passage LM.

The hydraulic pressure in the oil passage LM is regulated (reduced) to a predetermined pressure by the pressure regulating valve 510. Hereinafter, the hydraulic pressure in the oil passage LM, regulated by the pressure regulating valve 510, is also referred to as line pressure PL. The line pressure PL is supplied to each of the linear solenoid valves SL1, SL2, SL3.

The linear solenoid valve SL1 generates hydraulic pressure for engaging the clutch C1 (hereinafter, referred to as C1 pressure) by regulating the line pressure PL in response to the hydraulic pressure command value PbC1 from the controller 100. The C1 pressure is supplied to the clutch C1 via the oil passage L1.

The linear solenoid valve SL2 generates hydraulic pressure for engaging the brake B1 (hereinafter, referred to as B1 pressure) by regulating the line pressure PL in response to the hydraulic pressure command value PbB1 from the controller 100. The B1 pressure is supplied to the brake B1 via the oil passage L2.

The linear solenoid valve SL3 generates hydraulic pressure for engaging the clutch CS (hereinafter, referred to as CS pressure) by regulating the line pressure PL in response to the hydraulic pressure command value PbCS from the controller 100. The CS pressure is supplied to the clutch CS via the oil passage L3.

The simultaneous supply prevention valve 530 is provided in the oil passage L1, and is configured to prevent the clutch C1 and at least one of the brake B1 and the clutch CS from being simultaneously engaged. Specifically, the oil passages L2, L3 are connected to the simultaneous supply prevention valve 530. The simultaneous supply prevention valve 530 operates by using the B1 pressure and the CS pressure through the oil passages L2, L3 as signal pressures.

When both signal pressures that are the B1 pressure and the CS pressure are not input to the simultaneous supply prevention valve 530 (that is, when both the brake B1 and the clutch CS are released), the simultaneous supply prevention valve 530 is in a normal state in which the C1 pressure is supplied to the clutch C1. FIG. 4 illustrates the case where the simultaneous supply prevention valve 530 is in the normal state.

On the other hand, when at least one of the signal pressures that are the B1 pressure and the CS pressure is input to the simultaneous supply prevention valve 530 (that is, when at least one of the brake B1 and the clutch CS is engaged), even when the clutch C1 is engaged, the simultaneous supply prevention valve 530 switches into a drain state in which supply of the C1 pressure to the clutch C1 is cut off and the hydraulic pressure in the clutch C1 is released to the outside. Thus, the clutch C1 is released, so the clutch C1 and at least one of the brake B1 and the clutch CS are prevented from being simultaneously engaged.

Similarly, the simultaneous supply prevention valve 540 operates in response to the C1 pressure and the CS pressure as signal pressures to prevent the brake B1 and at least one of the clutch C1 and the clutch CS from being simultaneously engaged. Specifically, when both the signal pressures that are the C1 pressure and the CS pressure are not input to the simultaneous supply prevention valve 540, the simultaneous supply prevention valve 540 is in a normal state in which the B1 pressure is supplied to the brake B1. On the other hand, when at least one of the signal pressures that are the C1 pressure and the CS pressure is input to the simultaneous supply prevention valve 540, the simultaneous supply prevention valve 540 switches into a drain state in which supply of the B1 pressure to the brake B1 is cut off and the hydraulic pressure in the brake B1 is released to the outside. FIG. 4 illustrates the case where the C1 pressure is input to the simultaneous supply prevention valve 540 as the signal pressure and the simultaneous supply prevention valve 540 is in the drain state.

Similarly, the simultaneous supply prevention valve 550 operates by using the C1 pressure and the B1 pressure as signal pressures to prevent the clutch CS and at least one of the clutch C1 and the brake B1 from being simultaneously engaged. Specifically, when both the signal pressures that are the C1 pressure and the B1 pressure are not input to the simultaneous supply prevention valve 550, the simultaneous supply prevention valve 550 is in a normal state in which the CS pressure is supplied to the clutch CS. On the other hand, when at least one of the signal pressures that are the C1 pressure and the B1 pressure is input to the simultaneous supply prevention valve 550, the simultaneous supply prevention valve 550 switches into a drain state in which supply of the CS pressure to the clutch CS is cut off and the hydraulic pressure in the clutch CS is released to the outside. FIG. 4 illustrates the case where the C1 pressure is input to the simultaneous supply prevention valve 550 and the simultaneous supply prevention valve 550 is in the drain state.

The EOP 502 is driven by a motor (hereinafter, also referred to as internal motor) 502A provided inside to generate hydraulic pressure. The internal motor 502A is controlled by the control signal NM from the controller 100. Therefore, the EOP 502 is operable irrespective of whether the carrier CA2 is rotating. The EOP 502 outputs generated hydraulic pressure to the oil passage LE.

The hydraulic pressure in the oil passage LE is regulated (reduced) to a predetermined pressure by the pressure regulating valve 520. The oil passage LE is connected to the oil passage LM via the check valve 570. When the hydraulic pressure in the oil passage LE is higher by a predetermined pressure or more than the hydraulic pressure in the oil passage LM, the check valve 570 opens, and the hydraulic pressure in the oil passage LE is supplied to the oil passage LM via the check valve 570. Thus, during a stop of the MOP 501 as well, it is possible to supply hydraulic pressure to the oil passage LM by driving the EOP 502.

The electromagnetic change-over valve 560 is switched to any one of an on state and an off state in response to the control signal S/C from the controller 100. In the on state, the electromagnetic change-over valve 560 communicates the oil passage LE with the oil passage L4. In the off state, the electromagnetic change-over valve 560 interrupts the oil passage LE from the oil passage L4, and releases the hydraulic pressure in the oil passage L4 to the outside. FIG. 4 illustrates the case where the electromagnetic change-over valve 560 is in the off state.

The oil passage L4 is connected to the simultaneous supply prevention valves 530, 540. When the electromagnetic change-over valve 560 is in the on state, the hydraulic pressure in the oil passage LE is input to the simultaneous supply prevention valves 530, 540 via the oil passage L4 as a signal pressure. When the signal pressure from the oil passage L4 is input to the simultaneous supply prevention valve 530, the simultaneous supply prevention valve 530 is forcibly fixed to the normal state irrespective of whether the signal pressure (B1 pressure) is input from the oil passage L2. Similarly, when the signal pressure is input from the oil passage L4 to the simultaneous supply prevention valve 540, the simultaneous supply prevention valve 540 is forcibly fixed to the normal state irrespective of whether the signal pressure (C1 pressure) is input from the oil passage L1. Therefore, by driving the EOP 502 and switching the electromagnetic change-over valve 560 to the on state, the simultaneous supply prevention valves 530, 540 are simultaneously fixed to the normal state. Thus, the clutch C1 and the brake B1 are allowed to be simultaneously engaged, and two-motor mode (described later) is enabled.

Hereinafter, the details of control modes of the hybrid vehicle 1 will be described with reference to an operation engagement chart and the nomographs.

FIG. 5 is a chart that shows each drive mode and controlled statuses of the clutch C1 and brake B1 of the transmission unit 40 in each drive mode.

The controller 100 causes the hybrid vehicle 1 to travel in motor drive mode (hereinafter, referred to as EV mode) or hybrid mode (hereinafter, referred to as HV mode). The EV mode is a control mode in which the engine 10 is stopped and the hybrid vehicle 1 is caused to travel by using the power of at least one of the first MG 20 and the second MG 30. The HV mode is a control mode in which the hybrid vehicle 1 is caused to travel by using the power of the engine 10 and the power of the second MG 30. Each of the EV mode and the HV mode is further divided into some control modes.

In FIG. 5, C1, B1, CS, MG1 and MG2 respectively denote the clutch C1, the brake B1, the clutch CS, the first MG 20 and the second MG 30. The circle mark (○) in each of the C1, B1, CS columns indicates the engaged state, the cross mark (×) indicates the released state, and the triangle mark (Δ) indicates that any one of the clutch C1 and the brake B1 is engaged during engine brake. The sign G in each of the MG1 column and the MG2 column indicates that the MG1 or the MG2 is mainly operated as a generator. The sign M in each of the MG1 column and the MG2 column indicates that the MG1 or the MG2 is mainly operated as a motor.

In EV mode, the controller 100 selectively switches between one-motor mode and two-motor mode in response to a user's required torque, and the like. In one-motor mode, the hybrid vehicle 1 is caused to travel by using the power of the second MG 30 alone. In two-motor mode, the hybrid vehicle 1 is caused to travel by using the power of both the first MG 20 and the second MG 30.

When the load of the drive system 2 is low, the one-motor mode is used. When the load of the drive system 2 becomes high, the drive mode is changed to the two-motor mode.

As shown in E1 line of FIG. 5, when the hybrid vehicle 1 is driven (moved forward or reversed) in one-motor EV mode, the controller 100 places the transmission unit 40 in the neutral state (state in which no power is transmitted) by releasing the clutch C1 and releasing the brake B1. At this time, the controller 100 causes the first MG 20 to mainly operate as fixing means for fixing the rotation speed of the sun gear S2 to zero and causes the second MG 30 to mainly operate as a motor (see FIG. 6 (described later)). In order to cause the first MG 20 to operate as the fixing means, the current of the first MG 20 may be controlled by feeding back the rotation speed of the first MG 20 such that the rotation speed becomes zero. When the rotation speed of the first MG 20 is kept zero even when torque is zero, cogging torque may be utilized without adding current. When the transmission unit 40 is placed in the neutral state, the engine 10 is not co-rotated during braking, so a loss is smaller by that amount, and it is possible to recover large regenerated electric power.

As shown in the E2 line in FIG. 5, when the hybrid vehicle 1 is braked in one-motor EV mode and engine brake is required, the controller 100 engages any one of the clutch C1 and the brake B1. For example, when braking force is insufficient with only regenerative brake, engine brake is used together with regenerative brake. For example, when the SOC of the battery is close to a full charge state, regenerated electric power cannot be charged, so it is conceivable to establish an engine brake state.

By engaging any one of the clutch C1 and the brake B1, a so-called engine brake state is established. In the engine brake state, the rotation of the drive wheels 90 is transmitted to the engine 10, and the engine 10 is rotated. At this time, the controller 100 causes the first MG 20 to mainly operate as a motor, and causes the second MG 30 to mainly operate as a generator.

On the other hand, as shown in the E3 line in FIG. 5, when the hybrid vehicle 1 is driven (moved forward or reversed) in two-motor EV mode, the controller 100 restricts (locks) the rotation of the ring gear R1 of the transmission unit 40 by engaging the clutch C1 and engaging the brake B1. Thus, the rotation of the carrier CA2 of the differential unit 50 coupled to the ring gear R1 of the transmission unit 40 is also restricted (locked), so the carrier CA2 of the differential unit 50 is kept in a stopped state (Engine Rotation Speed Ne=0). The controller 100 causes the first MG 20 and the second MG 30 to mainly operate as motors (see FIG. 7 (described later)).

In EV mode (one-motor mode or two-motor mode), the engine 10 is stopped, so the MOP 501 is also stopped. Therefore, in EV mode, the clutch C1 or the brake B1 is engaged by using hydraulic pressure that is generated by the EOP 502.

In HV mode, the controller 100 causes the first MG 20 to mainly operate as a generator, and causes the second MG 30 to mainly operate as a motor.

In HV mode, the controller 100 sets the control mode to any one of the series-parallel mode and the series mode.

In series-parallel mode, part of the power of the engine 10 is used in order to drive the drive wheels 90, and the remaining part of the power of the engine 10 is used as power for generating electric power in the first MG 20. The second MG 30 drives the drive wheels 90 by using electric power generated by the first MG 20. In series-parallel mode, the controller 100 changes the speed ratio of the transmission unit 40 in response to the vehicle speed.

Figure 8:
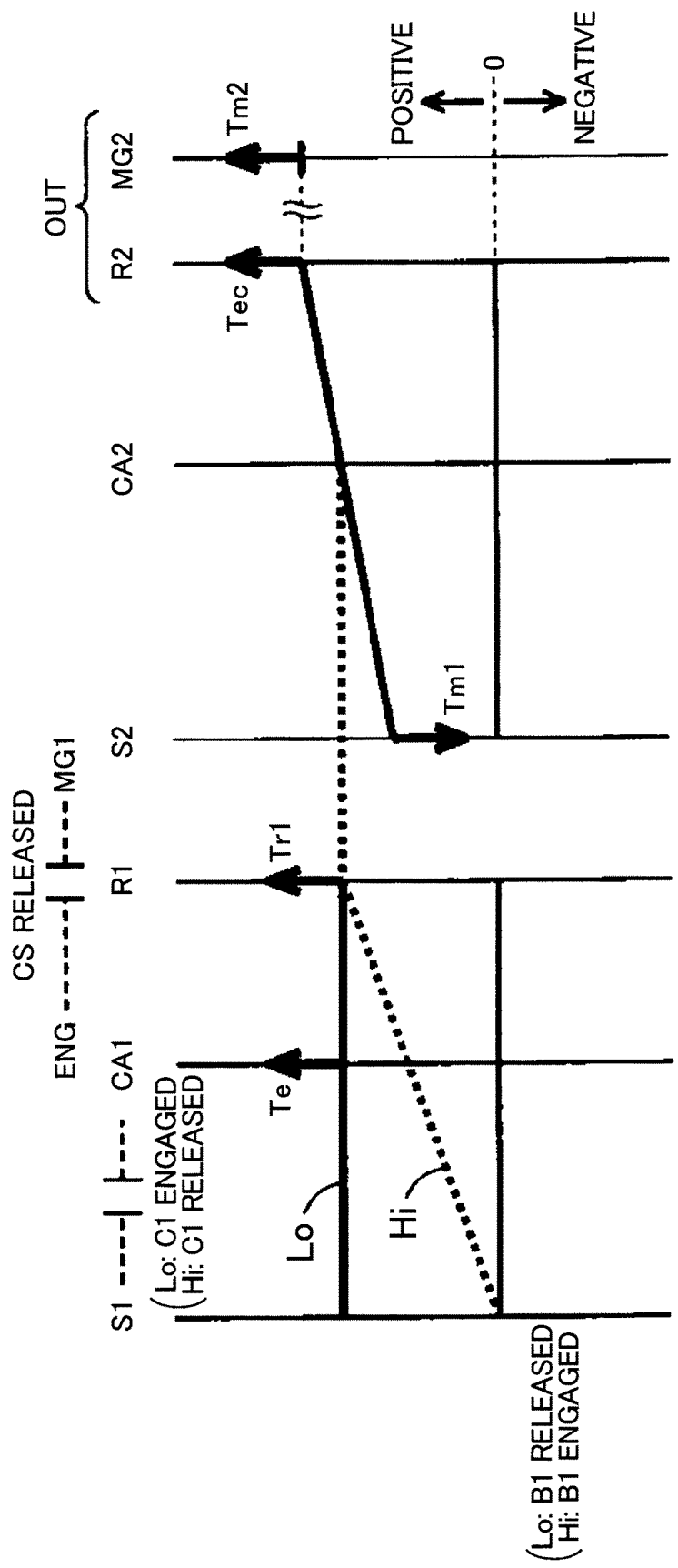
FIG. 8 is a nomograph in series-parallel HV mode that is one of the drive modes shown in FIG. 5.

When the hybrid vehicle 1 is caused to move forward in an intermediate or low speed range, the controller 100 establishes the low gear position Lo (see the continuous line in FIG. 8 (described later)) by engaging the clutch C1 and releasing the brake B1 as shown in the H2 line in FIG. 5. On the other hand, when the hybrid vehicle 1 is caused to move forward in a high speed range, the controller 100 establishes the high gear position Hi (see the dashed line in FIG. 8 (described later)) by releasing the clutch C1 and engaging the brake B1 as shown in the H1 line in FIG. 5. Either when the high gear position is established or when the low gear position is established, the transmission unit 40 and the differential unit 50 operate as a continuously variable transmission as a whole.

When the hybrid vehicle 1 is reversed, the controller 100 engages the clutch C1 and releases the brake B1 as shown in the H3 line in FIG. 5. When there is an allowance in the SOC of the battery, the controller 100 rotates the second MG 30 alone in the reverse direction; whereas, when there is no allowance in the SOC of the battery, the controller 100 generates electric power with the use of the first MG 20 by operating the engine 10 and rotates the second MG 30 in the reverse direction.

In series mode, the entire power of the engine 10 is used as power for generating electric power with the use of the first MG 20. The second MG 30 drives the drive wheels 90 by using electric power generated by the first MG 20. In series mode, when the hybrid vehicle 1 is moved forward or when the hybrid vehicle 1 is reversed, the controller 100 releases both the clutch C1 and the brake B1 and engages the clutch CS (see FIG. 9 (described later)) as shown in the H4 line and the H5 line in FIG. 5.

In HV mode, the engine 10 is operating, so the MOP 501 is also operating. Therefore, in HV mode, the clutch C1, the clutch CS or the brake B1 is engaged mainly by using hydraulic pressure generated by the MOP 501.

Hereinafter, the statuses of the rotating elements in each operation mode shown in FIG. 5 will be described with reference to the nomographs.

Figure 7:
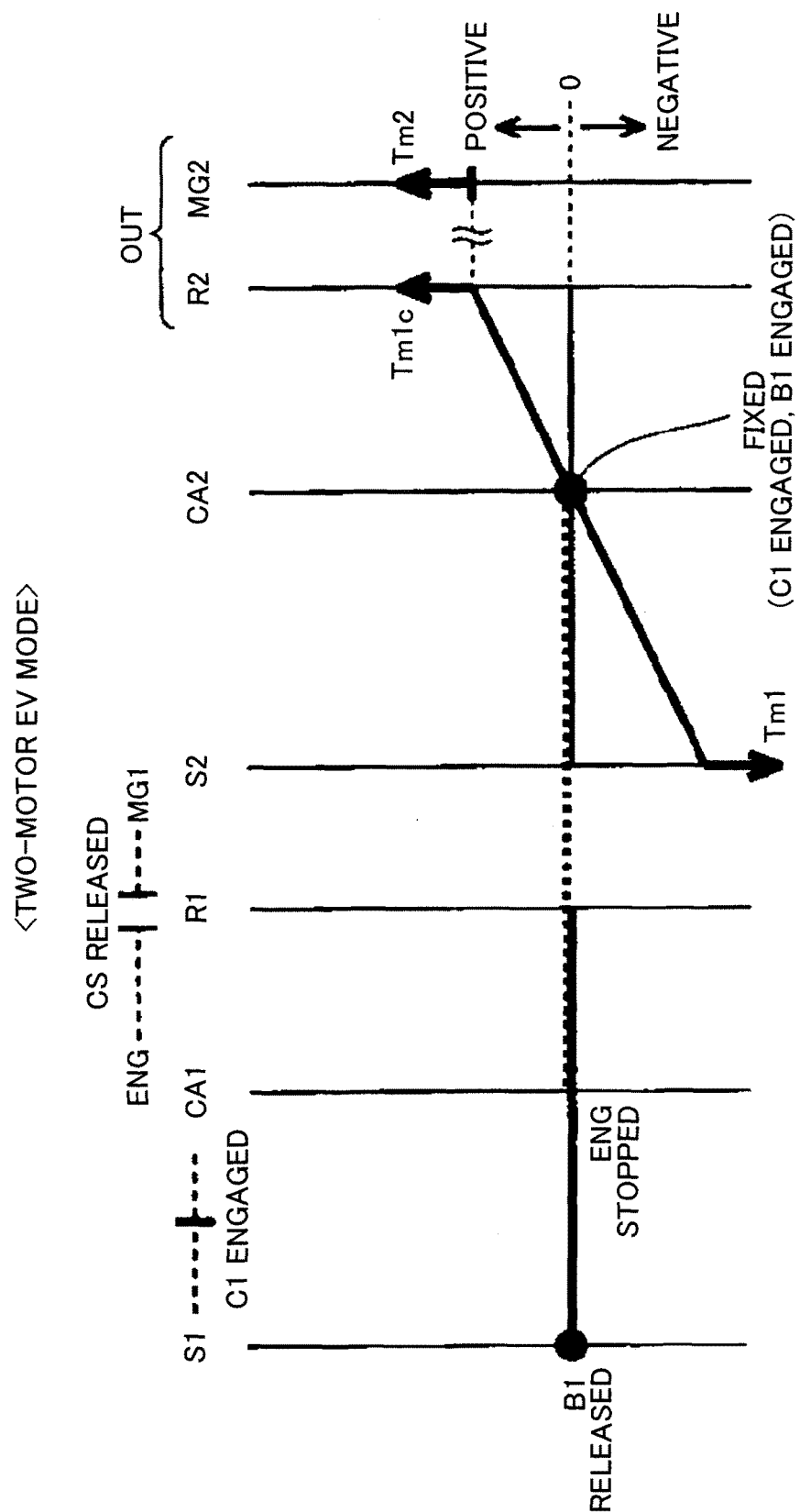
FIG. 7 is a nomograph in two-motor EV mode that is one of the drive modes shown in FIG. 5.
Figure 9:
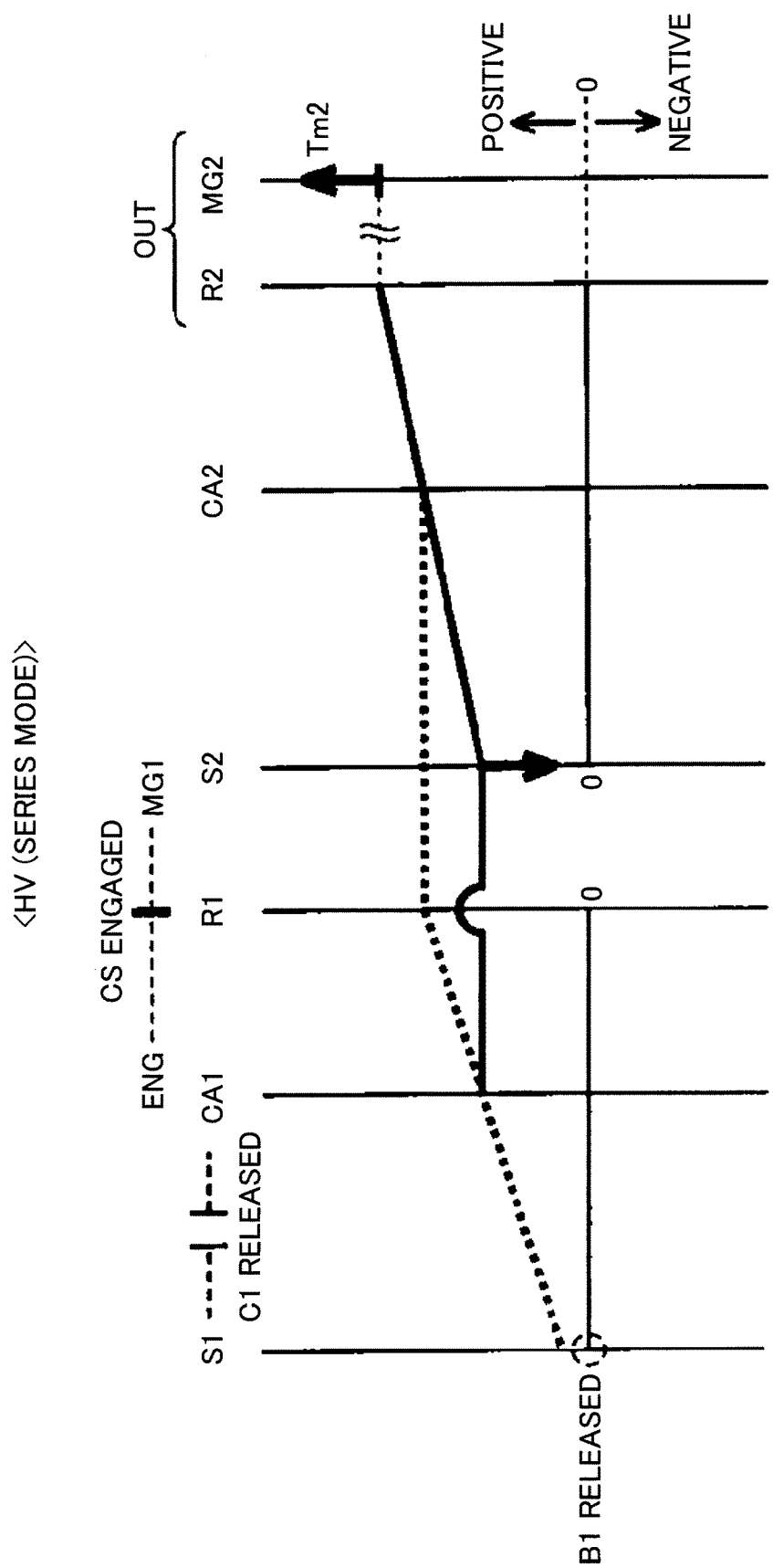
FIG. 9 is a nomograph in series HV mode that is one of the drive modes shown in FIG. 5.

FIG. 6 is a nomograph in one-motor EV mode. FIG. 7 is a nomograph in two-motor EV mode. FIG. 8 is a nomograph in series-parallel mode. FIG. 9 is a nomograph in series mode.

In FIG. 6 to FIG. 9, S1, CA1 and R1 respectively denote the sun gear S1, the carrier CA1 and the ring gear R1 of the transmission unit 40, S2, CA2 and R2 respectively denote the sun gear S2, the carrier CA2 and the ring gear R2 of the differential unit 50.

The controlled status in one-motor EV mode (E1 line in FIG. 5) will be described with reference to FIG. 6. In one-motor EV mode, the controller 100 releases the clutch C1, the brake B1 and the clutch CS of the transmission unit 40, stops the engine 10, and causes the second MG 30 to mainly operate as a motor. Therefore, in one-motor EV mode, the hybrid vehicle 1 travels by using the torque of the second MG 30 (hereinafter, referred to as second MG torque Tm2).

At this time, the controller 100 executes feedback control over the torque of the first MG 20 (hereinafter, referred to as first MG torque Tm1) such that the rotation speed of the sun gear S2 becomes zero. Therefore, the sun gear S2 does not rotate. However, because the clutch C1 and brake B1 of the transmission unit 40 are released, the rotation of the carrier CA2 of the differential unit 50 is not restricted. Therefore, the ring gear R2 and carrier CA2 of the differential unit 50 and the ring gear R1 of the transmission unit 40 are rotated (coasted) interlocking with the rotation of the second MG 30 in the same direction as the second MG 30.

On the other hand, the carrier CA1 of the transmission unit 40 is kept in a stopped state because the engine 10 is stopped. The sun gear S1 of the transmission unit 40 is rotated (coasted) interlocking with the rotation of the ring gear R1 in a direction opposite to the rotation direction of the ring gear R1.

In order to decelerate the vehicle in one-motor EV mode, it is allowed to activate engine brake in addition to regenerative brake using the second MG 30. In this case (E2 line in FIG. 5), by engaging any one of the clutch C1 and the brake B1, the engine 10 is also rotated at the time when the carrier CA2 is driven from the drive wheels 90 side, so engine brake is activated.

Next, the controlled status in two-motor EV mode (E3 line in FIG. 5) will be described with reference to FIG. 7. In two-motor EV mode, the controller 100 engages the clutch C1 and the brake B1, releases the clutch CS, and stops the engine 10. Therefore, the rotation of each of the sun gear S1, carrier CA1 and ring gear R1 of the transmission unit 40 is restricted such that the rotation speed becomes zero.

Because the rotation of the ring gear R1 of the transmission unit 40 is restricted, the rotation of the carrier CA2 of the differential unit 50 is also restricted (locked). In this state, the controller 100 causes the first MG 20 and the second MG 30 to mainly operate as motors. Specifically, the second MG 30 is rotated in the positive direction by setting the second MG torque Tm2 to a positive torque, and the first MG 20 is rotated in the negative direction by setting the first MG torque Tm1 to a negative torque.

When the rotation of the carrier CA2 is restricted by engaging the clutch C1, the first MG torque Tm1 is transmitted to the ring gear R2 by using the carrier CA2 as a supporting point. The first MG torque Tm1 (hereinafter, referred to as first MG transmission torque Tm1c) that is transmitted to the ring gear R2 acts in the positive direction, and is transmitted to the counter shaft 70. Therefore, in two-motor EV mode, the hybrid vehicle 1 travels by using the first MG transmission torque Tm1c and the second MG torque Tm2. The controller 100 adjusts the distribution ratio between the first MG torque Tm1 and the second MG torque Tm2 such that the sum of the first MG transmission torque Tm1c and the second MG torque Tm2 meets the user's required torque.

The controlled state in series-parallel HV mode (H1 to H3 lines in FIG. 5) will be described with reference to FIG. 8. FIG. 8 illustrates the case where the vehicle is traveling forward in the low gear position Lo (see H2 line in FIG. 5, and the continuous common line shown in the nomograph of S1, CA1 and R1 in FIG. 8) and the case where the vehicle is traveling forward in the high gear position Hi (see H1 line in FIG. 5, and the dashed common line shown in the nomograph of S1, CA1 and R1 in FIG. 8). For the sake of convenience of description, it is assumed that the rotation speed of the ring gear R1 is the same either when the vehicle is traveling forward in the low gear position Lo or when the vehicle is traveling forward in the high gear position Hi.

When the low gear position Lo is established in series-parallel HV mode, the controller 100 engages the clutch C1, and releases the brake B1 and the clutch CS. Therefore, the rotating elements (the sun gear S1, the carrier CA1 and the ring gear R1) rotate integrally with one another. Thus, the ring gear R1 of the transmission unit 40 also rotates at the same rotation speed as the carrier CA1, and the rotation of the engine 10 is transmitted from the ring gear R1 to the carrier CA2 of the differential unit 50 at the same rotation speed. That is, the torque of the engine 10 (hereinafter, referred to as engine torque Te) input to the carrier CA1 of the transmission unit 40 is transmitted from the ring gear R1 of the transmission unit 40 to the carrier CA2 of the differential unit 50. When the low gear position Lo is established, the torque that is transmitted from the ring gear R1 (hereinafter, referred to as transmission unit output torque Tr1) is equal to the engine torque Te (Te=Tr1).

The rotation of the engine 10, transmitted to the carrier CA2 of the differential unit 50, is steplessly shifted by the use of the rotation speed of the sun gear S2 (the rotation speed of the first MG 20), and is transmitted to the ring gear R2 of the differential unit 50. At this time, the controller 100 basically causes the first MG 20 to operate as a generator to apply the first MG torque Tm1 in the negative direction. Thus, the first MG torque Tm1 serves as reaction force for transmitting the engine torque Te, input to the carrier CA2, to the ring gear R2.

The engine torque Te transmitted to the ring gear R2 (hereinafter, referred to as engine transmission torque Tec) is transmitted from the counter drive gear 51 to the counter shaft 70, and acts as driving force of the hybrid vehicle 1.

In series-parallel HV mode, the controller 100 causes the second MG 30 to mainly operate as a motor. The second MG torque Tm2 is transmitted from the reduction gear 32 to the counter shaft 70, and acts as driving force of the hybrid vehicle 1. That is, in series-parallel HV mode, the hybrid vehicle 1 travels by using the engine transmission torque Tec and the second MG torque Tm2.

On the other hand, when the high gear position Hi is established in series-parallel HV mode, the controller 100 engages the brake B1, and releases the clutch C1 and the clutch CS. Because the brake B1 is engaged, the rotation of the sun gear S1 is restricted. Thus, the rotation of the engine 10, input to the carrier CA1 of the transmission unit 40, is increased in speed, and is transmitted from the ring gear R1 of the transmission unit 40 to the carrier CA2 of the differential unit 50. Therefore, when the high gear position Hi is established, the transmission unit output torque Tr1 is smaller than the engine torque Te (Te>Tr1).

The controlled status in series HV mode (H4 line in FIG. 5) will be described with reference to FIG. 9. In series HV mode, the controller 100 releases the clutch C1 and the brake B1, and engages the clutch CS. Therefore, when the clutch CS is engaged, the sun gear S2 of the differential unit 50 rotates at the same rotation speed as the carrier CA1 of the transmission unit 40, and the rotation of the engine 10 is transmitted from the clutch CS to the first MG 20 at the same rotation speed. Thus, electric power is allowed to be generated with the use of the first MG 20 by using the engine 10 as a power source.

On the other hand, because both the clutch C1 and the brake B1 are released, the rotation of each of the sun gear S1 and ring gear R1 of the transmission unit 40 and the rotation of the carrier CA2 of the differential unit 50 are not restricted. That is, because the transmission unit 40 is in the neutral state and the rotation of the carrier CA2 of the differential unit 50 is not restricted, the power of the first MG 20 and the power of the engine 10 are not transmitted to the counter shaft 70. Therefore, the second MG torque Tm2 of the second MG 30 is transmitted to the counter shaft 70. Therefore, in series HV mode, while electric power is generated with the use of the first MG 20 by using the engine 10 as a power source, the hybrid vehicle 1 travels by using the second MG torque Tm2 with the use of part or all of the generated electric power.

Because the series mode is allowed to be achieved, it is possible to select the operating point of the engine without concern for occurrence of tooth contact noise of the gear mechanism due to engine torque fluctuations, to which attention needs to be paid in series-parallel mode, when the vehicle travels at a low vehicle speed or when the vehicle is in a vehicle state where background noise is low. Thus, a vehicle state that enables both quietness of the vehicle and improvement in fuel consumption increases.

Figure 10:
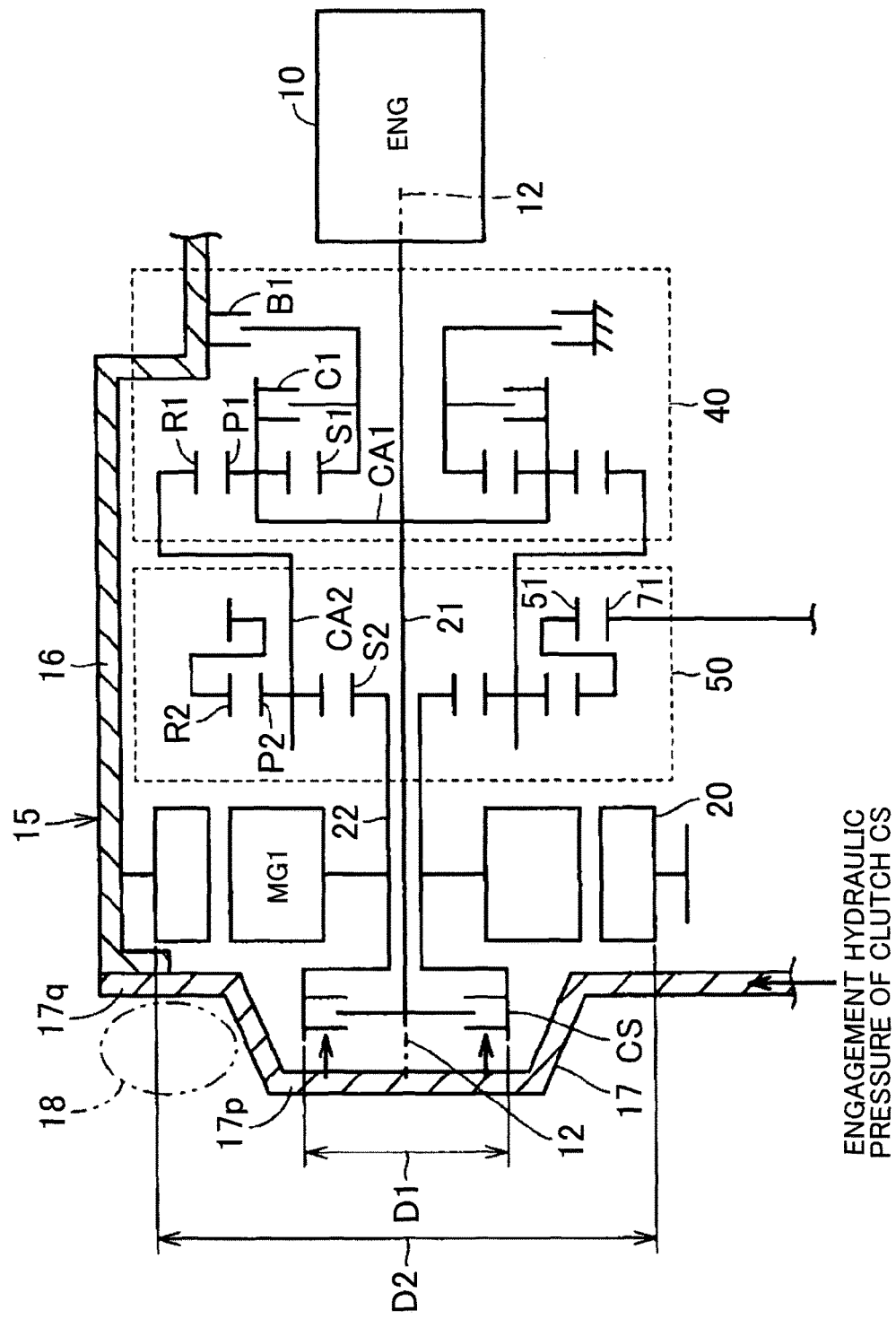
FIG. 10 is a view that shows a case structure of the drive system shown in FIG. 1.

Next, arrangement of the transmission unit, the differential unit, the first MG and the clutch will be described. FIG. 10 is a view that shows the case structure of the drive system shown in FIG. 1. As shown in FIG. 10, the transmission unit 40, the differential unit 50, the first MG 20 and the clutch CS are provided along the first axis 12.

Along the first axis 12, the clutch CS is provided across the first MG 20 from the engine 10. The clutch CS is provided at a position farthest from the engine 10 among the transmission unit 40, the differential unit 50, the first MG 20 and the clutch CS. The transmission unit 40, the differential unit 50 and the first MG 20 are provided along the first axis 12 between the engine 10 and the clutch CS. The clutch CS and the first MG 20 are provided next to each other along the first axis 12.

When viewed in the direction of the first axis 12, the diameter D1 of the clutch CS is smaller than the diameter D2 of the first MG 20 (D1<D2). That is, the outermost diameter (diameter D1) of the clutch CS is smaller than the outermost diameter (diameter D2) of the first MG 20.

The drive system 2 includes a case body 15. The case body 15 has a case shape, and accommodates the components of the drive system 2, such as the transmission unit 40, the differential unit 50, the first MG 20 and the clutch CS.

The case body 15 includes a transaxle (T/A) case 16 and a rear cover 17. The T/A case 16 has such a shape that the T/A case 16 extends in a cylindrical shape away from the engine 10 while surrounding the transmission unit 40, the differential unit 50 and the first MG 20. The T/A case 16 has an opening along the extension of the first axis 12. The rear cover 17 is provided so as to close the opening of the T/A case 16. The rear cover 17 is provided so as to cover the clutch CS that protrudes from the opening of the T/A case 16.

The rear cover 17 has a top 17p and a step 17q as its constituent sections. The top 17p is provided so as to face the clutch CS in the direction of the first axis 12. The step 17q is provided so as to have a step in the direction of the first axis 12 with respect to the top 17p. The step 17q has such a recessed shape that the step 17q is recessed in a direction to approach the engine 10 from the periphery of the top 17p.

With the configuration that the clutch CS having a smaller diameter than the first MG 20 is arranged on the side far from the engine 10, it is possible to make the case body 15 compact. More specifically, because a recess is formed at the end in the direction of the first axis 12 by the end face of the first MG 20 and the outer periphery of the clutch CS, the step 17q is allowed to be provided in the rear cover 17. Thus, a space 18 is formed, and it is possible to effectively utilize space around the drive system 2.

In the present embodiment, an oil passage for supplying hydraulic oil to the clutch CS is provided in the case body 15 (rear cover 17). By providing the clutch CS at a position at which the clutch CS faces the case body 15 (rear cover 17) in the direction of the first axis 12, it is possible to easily provide a mechanism of supplying hydraulic oil to the clutch CS through the case body 15 (rear cover 17). Thus, it is possible to simplify the oil passage structure of hydraulic oil to the clutch CS.

In the present embodiment, along the first axis 12, the differential unit 50, the first MG 20 and the clutch CS are arranged from the side close to the engine 10 in the stated order. With the above configuration, it is possible to add the clutch CS to the double-axis drive system in which the differential unit 50 and the first MG 20 are arranged from the side close to the engine 10 in the stated order, without requiring a significant design change, such as an increase in the pitch between the differential unit 50 and the first MG 20, for the purpose of providing the clutch CS.

Arrangement of the transmission unit 40, the differential unit 50, the first MG 20 and the clutch CS along the first axis 12 is not limited to the mode shown in FIG. 10. For example, the clutch CS may be arranged between the differential unit 50 and the first MG 20 or may be arranged between the transmission unit 40 and the differential unit 50.

By setting the position of the clutch CS at the end, it is possible to commonly use the T/A case 16 between the drive system for a vehicle provided with the clutch CS and having such a configuration that the series mode is possible and the drive system for a vehicle not provided with the clutch CS and having such a configuration that the input shaft 21 and the rotary shaft 22 are not connected to each other. Therefore, it is possible to reduce manufacturing cost at the time of manufacturing a plurality of models.

In the vehicle 1 having the above-described configuration, at the time of switching from series-parallel mode in which the clutch CS is in the released state and the transmission unit is in the non-neutral state to series mode in which the clutch CS is in the engaged state and the transmission unit is in the neutral state, the vehicle 1 changes from a state where the direct torque of the engine 10 is transmittable to the drive wheels 90 to a state where transmission of power is interrupted between the engine 10 and the drive wheels 90. At this time, when there is a rotation speed difference between the rotation speed (hereinafter, referred to as first rotation speed) of one rotating element (first MG 20) of the clutch CS and the rotation speed (hereinafter, referred to as second rotation speed) of the other engagement target rotating element (engine 10) and the first rotation speed and the second rotation speed are not synchronous with each other, switching into series mode may delay until the rotation speed difference reduces.

In the characterized portion of the present embodiment, at the time when the controller 100 switches from series-parallel mode to series mode, the controller 100 controls the transmission unit 40 such that the transmission unit 40 is placed in the neutral state and then controls the first MG 20 such that the first rotation speed of the first MG 20 and the second rotation speed of the engine 10 are synchronous with each other.

With this configuration, it is possible to switch the clutch CS to the engaged state in a state where the first rotation speed and the second rotation speed are synchronous with each other. Therefore, it is possible to smoothly switch from series-parallel mode to series mode.

Figure 11:
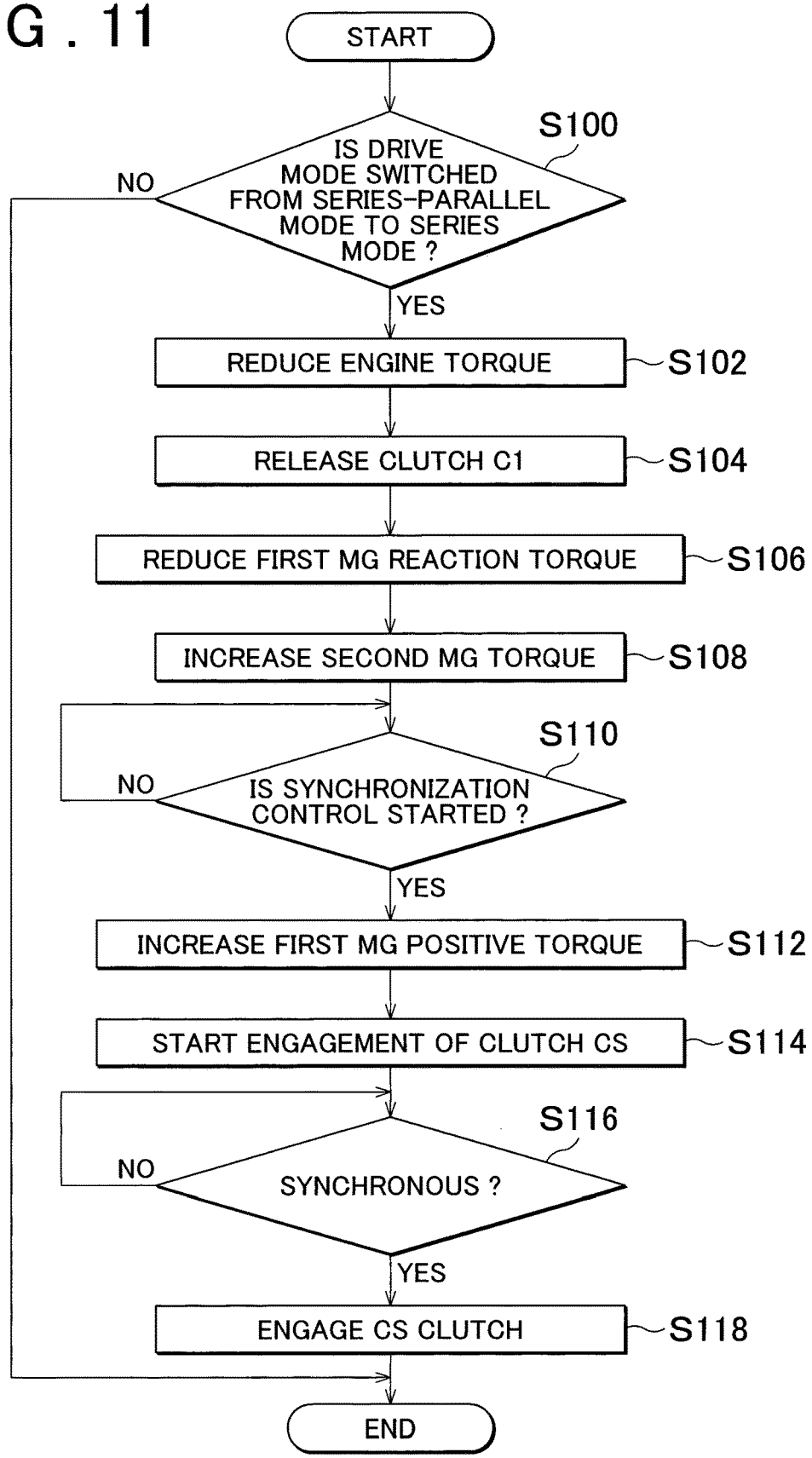
FIG. 11 is a flowchart that shows a control process of synchronization control that is executed by the controller according to the embodiment.

Hereinafter, a control process that is executed by the controller 100 in the case where the drive mode is switched from series-parallel mode to series mode in the present embodiment will be described with reference to FIG. 11.

In step (hereinafter, step is abbreviated as S) 100, the controller 100 determines whether the drive mode is switched from series-parallel mode to series mode. For example, when the state of the vehicle has changed from a series-parallel mode region to a series mode region, the controller 100 determines that the drive mode is switched from series-parallel mode to series mode.

The series-parallel mode region is, for example, a region in which a vehicle load (for example, which is calculated from an accelerator pedal operation amount, or the like) is a positive value larger than a predetermined load or a region in which the speed of the vehicle is higher than a predetermined speed. The series mode region is, for example, a region in which the vehicle load is smaller than the predetermined load and a region in which the speed of the vehicle is lower than the predetermined speed. The series mode region includes a region in which the vehicle load is a negative value. The series-parallel mode region and the series mode region are not specifically limited to the above-described regions. When it is determined that the drive mode is switched from series-parallel mode to series mode (YES in S100), the process proceeds to S102. Otherwise (NO in S100), the process ends.

In S102, the controller 100 reduces the output torque of the engine 10. In the present embodiment, the controller 100, for example, controls the engine 10 such that the output torque stepwisely reduces with a lapse of time with reference to the output torque just before it is determined that the drive mode is switched from series-parallel mode to series mode. The amount of reduction in output torque in each phase is set so as to suppress a steep increase in the rotation speed of the engine 10, and is, for example, determined in response to a reduction in the reaction torque of the first MG 20 (described later). In the present embodiment, description will be made on the assumption that a reduction in engine torque at the beginning of switching from series-parallel mode to series mode is carried out stepwisely; however, a reduction in engine torque is not specifically limited to a stepwise reduction. The engine torque may be reduced linearly or non-linearly. The controller 100, for example, reduces the output torque by adjusting the opening degree of a throttle valve (not shown) of the engine 10.

In S104, the controller 100 starts releasing control for placing the clutch C1 in the released state by reducing hydraulic pressure that is supplied to the clutch C1. The controller 100 places the clutch C1 in the released state by, for example, reducing a control command value of hydraulic pressure that is supplied to the clutch C1 to a predetermined value and then reducing the control command value at a predetermined rate of reduction.

In S106, the controller 100 reduces the reaction torque (torque in the negative rotation direction) of the first MG 20 against the output torque of the engine 10. The controller 100 controls the first MG 20 such that the reaction torque stepwisely reduces (approaches to zero) with a lapse of time with reference to the reaction torque just before it is determined whether the drive mode is switched from the series-parallel mode to the series mode. The amount of reduction in the reaction torque of the first MG 20 in each phase is set so as to suppress a steep increase in the rotation speed of the first MG 20, and is, for example, determined in response to a reduction in the output torque of the engine 10. In the present embodiment, description will be made on the assumption that a reduction in reaction torque at the beginning of switching from series-parallel mode to series mode is carried out stepwisely with a stepwise reduction in engine torque; however, a reduction in reaction torque is not specifically limited to a stepwise reduction. The reaction torque may be reduced linearly or non-linearly.

Execution of the above-described processes of S102, S104 and S106 is not specifically limited to the order described in the flowchart. The order of execution may be changed.

In S108, the controller 100 increases the output torque of the second MG 30. The controller 100 controls the second MG 30 such that the output torque increases with a lapse of time with reference to the output torque just before it is determined that the drive mode is switched from series-parallel mode to series mode. When the transmission unit 40 changes to the neutral state as a result of switching of the clutch C1 from the engaged state to the released state, the direct torque from the engine to the drive wheels 90 via the transmission unit 40 reduces as the transmission unit 40 becomes closer to the neutral state. Therefore, the controller 100 increases the output torque of the second MG 30 up to a ceiling of the amount of reduction in direct torque from the engine to the drive wheels 90. For example, it is possible to suppress a change in the driving force of the vehicle 1 in the case where the drive mode is switched from series-parallel mode to series mode by compensating for the entire amount of reduction in direct torque with the output torque of the second MG 30. Alternatively, it is possible to suppress a change in the driving force of the vehicle 1 in the case where the drive mode is switched from series-parallel mode to series mode while suppressing electric power consumption due to an increase in the output torque of the second MG 30 by compensating for a constant amount in the amount of reduction in direct torque or a constant rate of the amount of reduction in direct torque with an increase in the output torque of the second MG 30. The controller 100 may, for example, estimate the amount of reduction in direct torque on the basis of the hydraulic pressure or hydraulic pressure command value of the clutch C1, or the like.

In S110, the controller 100 determines whether to start synchronization control. The controller 100, for example, determines to start synchronization control when a start condition for synchronization control is satisfied. The start condition may include, for example, a condition that a predetermined time has elapsed from when it is determined that the drive mode is switched from series-parallel mode to series mode or a condition that the difference between the first rotation speed of the first MG 20 and the second rotation speed of the engine 10 is larger than a threshold in a period from when it is determined that the drive mode is switched from series-parallel mode to series mode to when the clutch CS is engaged. When it is determined to start synchronization control (YES in S110), the process proceeds to S112. Otherwise (NO in S110), the process returns to S110.

In S112, the controller 100 controls the first MG 20 such that a positive torque is generated by the first MG 20. Thus, the rotation speed of the first MG 20 increases in the positive rotation direction. The controller 100 controls the first MG 20 such that the output torque of the first MG 20 becomes a predetermined positive torque.

When the first rotation speed of the first MG 20 is lower than the second rotation speed of the engine 10, the controller 100 may increase the rotation speed in the positive rotation direction by generating a predetermined positive torque. When the first rotation speed is higher than the second rotation speed, the controller 100 may increase the rotation speed in the negative rotation direction by generating a predetermined negative torque.

In S114, the controller 100 starts supplying hydraulic pressure to the clutch CS. The controller 100, for example, starts supplying hydraulic pressure to the clutch CS when a predetermined time has elapsed from when synchronization control is started. The controller 100, for example, starts supplying hydraulic pressure to such an extent that play reduction (elimination of ineffective stroke) is possible.

In S116, the controller 100 determines whether the first rotation speed of the rotary shaft of the first MG 20 and the second rotation speed of the output shaft (crankshaft) of the engine 10 are synchronous with each other. For example, when the difference between the first rotation speed and the second rotation speed is smaller than the threshold, the controller 100 determines that the first rotation speed and the second rotation speed are synchronous with each other. When it is determined that the first rotation speed and the second rotation speed are synchronous with each other (YES in S116), the process proceeds to S118. Otherwise (NO in S116), the process returns to S116.

In S118, the controller 100 places the clutch CS in the engaged state by increasing the hydraulic pressure, which is supplied to the clutch CS, to the maximum. The controller 100, for example, increases the hydraulic pressure, which is supplied to the clutch CS, at a predetermined rate of change until a lapse of a predetermined time from when it is determined that the first rotation speed and the second rotation speed are synchronous with each other, and stepwisely increases the hydraulic pressure, which is supplied to the clutch CS, at the time when the predetermined time has elapsed.

The operation of the controller 100 in the present embodiment based on the above-described structure and flowchart will be described with reference to FIG. 12 and FIG. 13.

Figure 12:
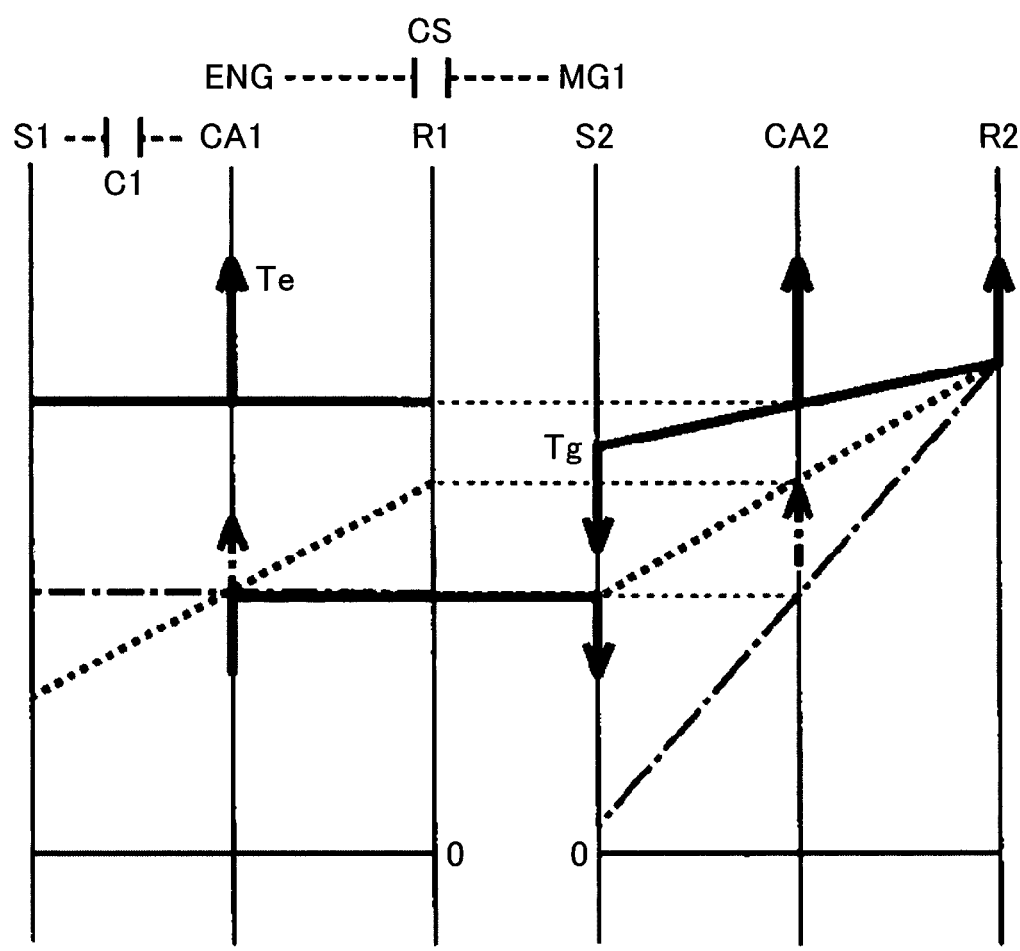
FIG. 12 is a nomograph for illustrating the process of synchronization control according to the embodiment.

FIG. 12 shows a change in nomograph before and after switching from series-parallel mode to series mode. FIG. 13 shows temporal changes in the rotation speed of the engine 10, the engine torque, the torque of the first MG 20, the rotation speed of the first MG 20, the rotation speed of the output shaft of the transmission unit 40, the torque of the second MG 30, the rotation speed of the second MG 30, the hydraulic pressure of the clutch C1, the hydraulic pressure of the clutch CS and a vehicle longitudinal G at the time of switching from series-parallel mode to series mode.

For example, it is assumed that the clutch C1 is in the engaged state and both the brake B1 and the clutch CS are in the released state. It is assumed that the engine 10 is in operation, power generating operation using the first MG 20 is being carried out and part of the torque of the engine 10 is transmitted to the drive wheels 90 via the differential unit 50 as direct torque.

As indicated by the common line (continuous line) in the nomograph of FIG. 12, because the clutch C1 is in the engaged state, the sun gear S1, the carrier CA1 and the ring gear R1 in the transmission unit 40 rotate integrally with one another. Because the ring gear R1 and the carrier CA2 are coupled to each other such that the rotation centers coincide with each other, the sun gear S1, the carrier CA1, the ring gear R1 and the carrier CA2 rotate at the same rotation speed as the engine 10. The engine torque Te of the engine 10 is distributed by the differential unit 50 to the first MG 20 side and the second MG 30 side. Part of the engine torque Te, distributed to the second MG 30 side, is transmitted from the engine 10 to the drive wheels 90 as direct torque. Part of the engine torque Te, distributed to the first MG 20 side, is used for power generating operation. A torque Tg in the negative rotation direction is output from the first MG 20 during power generating operation. In this state, when the engine torque in the positive rotation direction acts on the rotary shaft of the first MG 20 and the first MG 20 is rotated in the positive rotation direction, electric power is generated.

Figure 13:
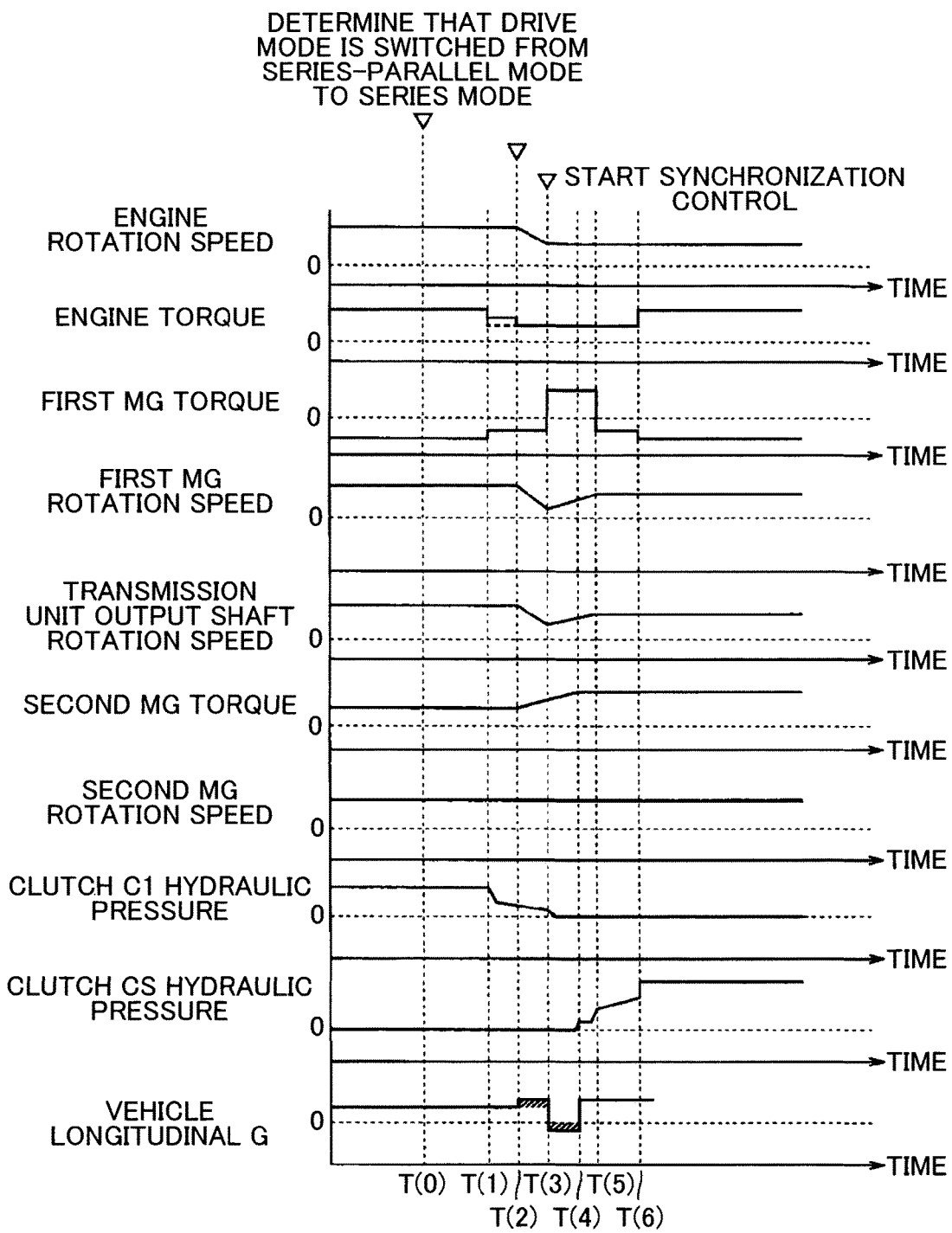
FIG. 13 is a timing chart for illustrating the process of synchronization control according to the embodiment.

As shown in FIG. 13, at time T(0), it is determined that the drive mode is switched from series-parallel mode to series mode (YES in S100) as a result of the fact that the state of the vehicle 1 changes from the series-parallel mode region to the series mode region. At time T(1) at which the predetermined time has elapsed from when the switching is determined, the engine 10 is controlled such that the engine torque stepwisely reduces (S102). The hydraulic circuit 500 (specifically, the linear solenoid valve SL1) is controlled such that the hydraulic pressure that is supplied to the clutch C1 reduces (S104). In addition, the first MG 20 is controlled such that the torque (reaction torque) of the first MG 20 in the negative rotation direction stepwisely reduces (approaches to zero) (S106).

When the engine torque is further stepwisely reduced at time T(2), the rotation speed of the first MG 20 reduces together with the rotation speed of the engine 10. Therefore, in the transmission unit 40, to the positions indicated by the common lines (alternate long and short dashes lines) in the nomograph of FIG. 12, each of the rotation speed of the engine 10 and the rotation speed of the first MG 20 reduces. At this time, the rotation speed of the first MG 20 is lower than the rotation speed of the engine 10. Because the transmission unit 40 becomes closer to the neutral state as the hydraulic pressure that is supplied to the clutch C1 reduces, direct torque that is transmitted from the engine 10 to the drive wheels 90 via the transmission unit 40 reduces.

In this case, because the torque of the second MG 30 is increased up to a ceiling of the amount of reduction in direct torque (S108), a reduction in the driving force of the vehicle 1 in a period in which the drive mode is switched from series-parallel mode to series mode is suppressed.

As a result of dissipation of inertia due to a decrease in each of the first rotation speed and the second rotation speed, the vehicle longitudinal G changes in the drive wheels 90 so as to increase toward the front of the vehicle 1.

At time T(3), when the start condition for synchronization control is satisfied (YES in S110) as a result of the fact that the predetermined time has elapsed from when it is determined that the drive mode is switched from series-parallel mode to series mode, the positive torque of the first MG 20 is increased (S112). Thus, the rotation speed of the first MG 20 increases, so the rotation speed of the first MG 20 becomes close to a synchronous rotation speed at which the rotation speed of the first MG 20 is synchronous with the rotation speed of the engine 10. As a result, the rotation speed of the first MG 20 increases to the point indicated by the common line (dashed line) in the nomograph of FIG. 12.

As a result of an increase in the positive torque of the first MG 20, the first rotation speed increases. Therefore, because of drawing of inertia, the vehicle longitudinal G changes in the drive wheels 90 so as to increase toward the rear of the vehicle 1.

At time T(4) at which the predetermined time has elapsed from when synchronization control is started, engagement control over the clutch CS is started (S114). At time T(5), when the first rotation speed and the second rotation speed are synchronous with each other (YES in S116), the hydraulic pressure that is supplied to the clutch CS is increased (S118), and the clutch CS is placed in the engaged state by time T(6). Because engagement of the clutch CS is started at time T(5), the first MG 20 is controlled so as to generate a negative torque corresponding to the amount of electric power generation. At this time, because both the clutch C1 and the brake B1 are in the released state, the engine 10 is separated from the drive wheels 90. On the other hand, because the clutch CS is in the engaged state, the power of the engine 10 is transmittable to only the first MG 20 via the clutch CS. Therefore, as a result of generation of power generating torque (reaction torque) in the first MG 20, power generating operation using the engine 10 as a power source is carried out. At time T(6), when the engine torque is increased to a magnitude corresponding to the series mode, the reaction torque of the first MG 20 is also increased to a magnitude corresponding to the series mode.

As described above, with the hybrid vehicle according to the present embodiment, at the time of switching from series-parallel mode to series mode, after starting to control the transmission unit such that the transmission unit is placed in the neutral state, the first MG 20 is controlled such that the first rotation speed and the second rotation speed are synchronous with each other. For this reason, it is possible to switch the clutch CS to the engaged state in a state where the first rotation speed and the second rotation speed are synchronous with each other. Therefore, it is possible to provide the hybrid vehicle that smoothly switches from series-parallel mode to series mode.

In addition, at the time of switching from series-parallel mode to series mode, the controller 100 controls the transmission unit 40 such that the transmission unit 40 is placed in the neutral state, and controls the engine 10 such that the output torque of the engine 10 reduces.

With this configuration, it is possible to suppress an unnecessary increase in the rotation speed of the engine 10.

In addition, at the time of switching from series-parallel mode to series mode, the controller 100 controls the transmission unit 40 such that the transmission unit 40 is placed in the neutral state, and increases the output torque of the second MG 30.

With this configuration, it is possible to compensate for the amount of reduction in direct torque from the engine to the drive wheels 90 via the transmission unit 40, which reduces as the transmission unit 40 becomes closer to the neutral state, by increasing the output torque of the second MG 30. Therefore, when the drive mode is switched from series-parallel mode to series mode, it is possible to suppress a change in the driving force of the vehicle 1.

Hereinafter, an alternative embodiment regarding synchronization control using the first MG 20 will be described. In the present embodiment, description is made on the assumption that engagement of the clutch CS is started after a lapse of the predetermined time from when synchronization control is started. Instead, for example, engagement of the clutch CS may be started at the time when synchronization control is started.

Figure 14:
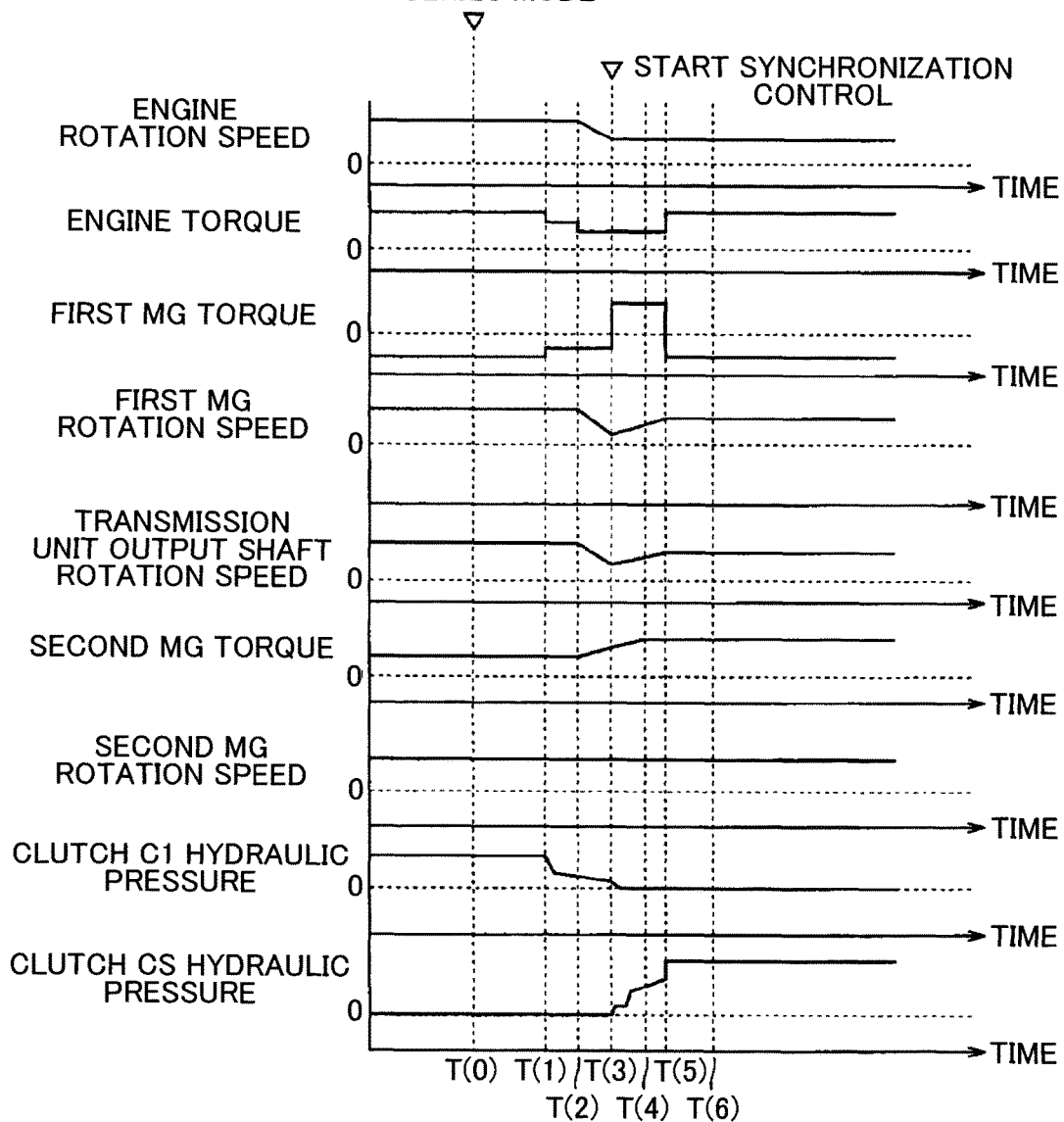
FIG. 14 is a timing chart for illustrating the process of synchronization control in the case where engagement timing of the clutch CS is changed according to an alternative embodiment to the embodiment.

For example, as the alternative embodiment to the present embodiment, as shown in FIG. 14, at time T(3) prior to time T(4), synchronization control may be started, and supply of hydraulic pressure to the clutch CS may be started. FIG. 14 shows a similar change to that of FIG. 13 except that a change in the vehicle longitudinal G is omitted and the timing of an increase in the hydraulic pressure of the clutch CS is varied. Therefore, the detailed description thereof will not be repeated.

With this configuration, it is possible to shorten a time, which is required to switch from series-parallel mode to series mode, as compared to when supply of hydraulic pressure of the clutch CS is started at the timing shown in FIG. 13. The operation to advance the timing at which engagement of the clutch CS is started is, for example, desirably carried out when a mode in which a high driving force is required, such as a sport drive mode, is selected by a driver.

With this configuration, it is possible to switch from series-parallel mode to series mode in high response to a user's request, for example, when an increase in the depression amount of the accelerator or a return of the accelerator is carried out by a user.

In the present embodiment, description is made on the assumption that the clutch CS is engaged when the first rotation speed and the second rotation speed are synchronous with each other after synchronization control is started. Instead, control for reducing the torque of at least any one of the first MG 20 and the second MG 30 may be executed at the end of synchronization control.

Figure 15:
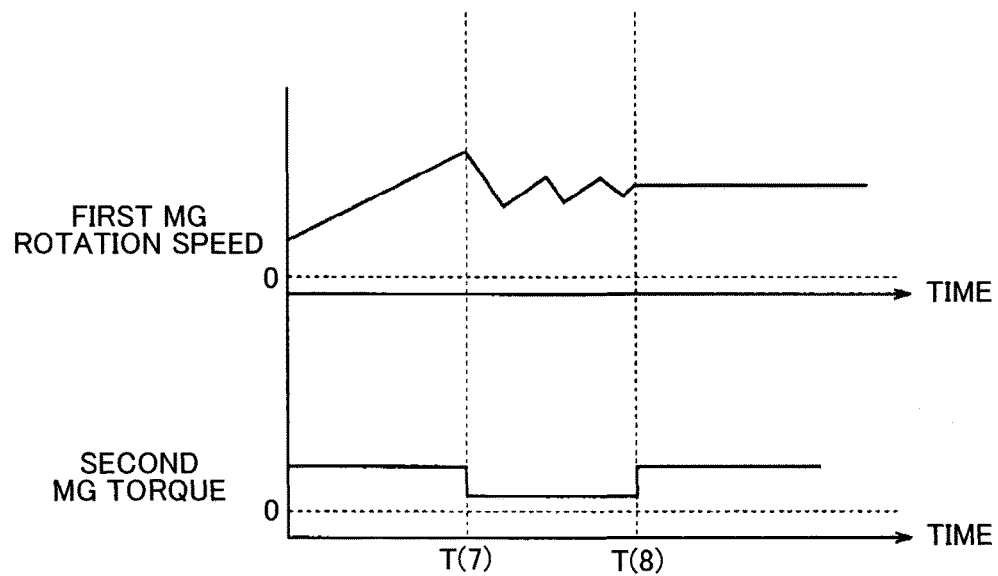
FIG. 15 is a timing chart for illustrating a control process in the case where shock reduction control for reducing a shock at the time of engagement of the clutch is executed together with synchronization control according to another alternative embodiment to the embodiment.

When the first rotation speed of the first MG 20 is increased in synchronization control, the first rotation speed may overshoot the second rotation speed around the point at which the first rotation speed is synchronous with the second rotation speed or the first rotation speed may oscillate as shown in FIG. 15 as another alternative embodiment to the present embodiment. In such a case, when the clutch CS is engaged, a shock may occur, the shock may be transmitted to the drive wheels 90, and, as a result, a shock may occur in the vehicle 1.

For example, as shown in FIG. 15, when the first rotation speed exceeds the second rotation speed or the difference between the first rotation speed and the second rotation speed becomes smaller than a threshold (a value larger than a threshold for determining synchronization) at time T(7), the controller 100 may reduce the output torque of the second MG 30 by a predetermined value until time T(8) at which the difference between the first rotation speed and the second rotation speed converges. The controller 100 may reduce the torque of the first MG 20 by a predetermined value as compared to the torque just before time T(7) instead of or in addition to a reduction in the output torque of the second MG 30. The value does not need to be constant. For example, when the difference between the first rotation speed and the second rotation speed is smaller than the threshold for determining synchronization and when a temporal amount of change in the difference per predetermined time (for example, an amount of change per unit time) is smaller than a threshold, the controller 100 may determine that the difference between the first rotation speed and the second rotation speed has converged.

With this configuration, because torque fluctuations that occur as a result of engagement of the clutch CS is suppressed, it is possible to smoothly switch from series-parallel mode to series mode.

Alternative Embodiment of Control for EV Mode and HV Mode

As described in the control modes shown in FIG. 5, when the engine 10 and the first MG 20 are directly coupled to each other with the clutch CS and the transmission unit 40 is controlled to the neutral state by placing both the clutch C1 and the brake B1 in the released state in HV mode, the vehicle is operable in series mode.

Hereinafter, the fact that it is possible to cause the vehicle to operate in further another operation mode with the use of the clutch CS will be described.

FIG. 16 shows further another alternative embodiment to the present embodiment and is a chart that shows the controlled statuses of the clutch C1 and brake B1 of the transmission unit 40 in each drive mode.

In FIG. 16, E4 and E5 lines are added to the EV mode in FIG. 5, and H6 to H9 lines are added to the HV mode in FIG. 5. The marks in FIG. 16 denote similar meanings to the marks in FIG. 5.

Initially, E4 and E5 lines added to the EV mode will be described. These additional modes as well as E3 line are two-motor modes, and differ from E3 line in that these additional modes are operable even when the engine rotation speed Ne is not zero (Ne free in FIG. 16).

Figure 17:
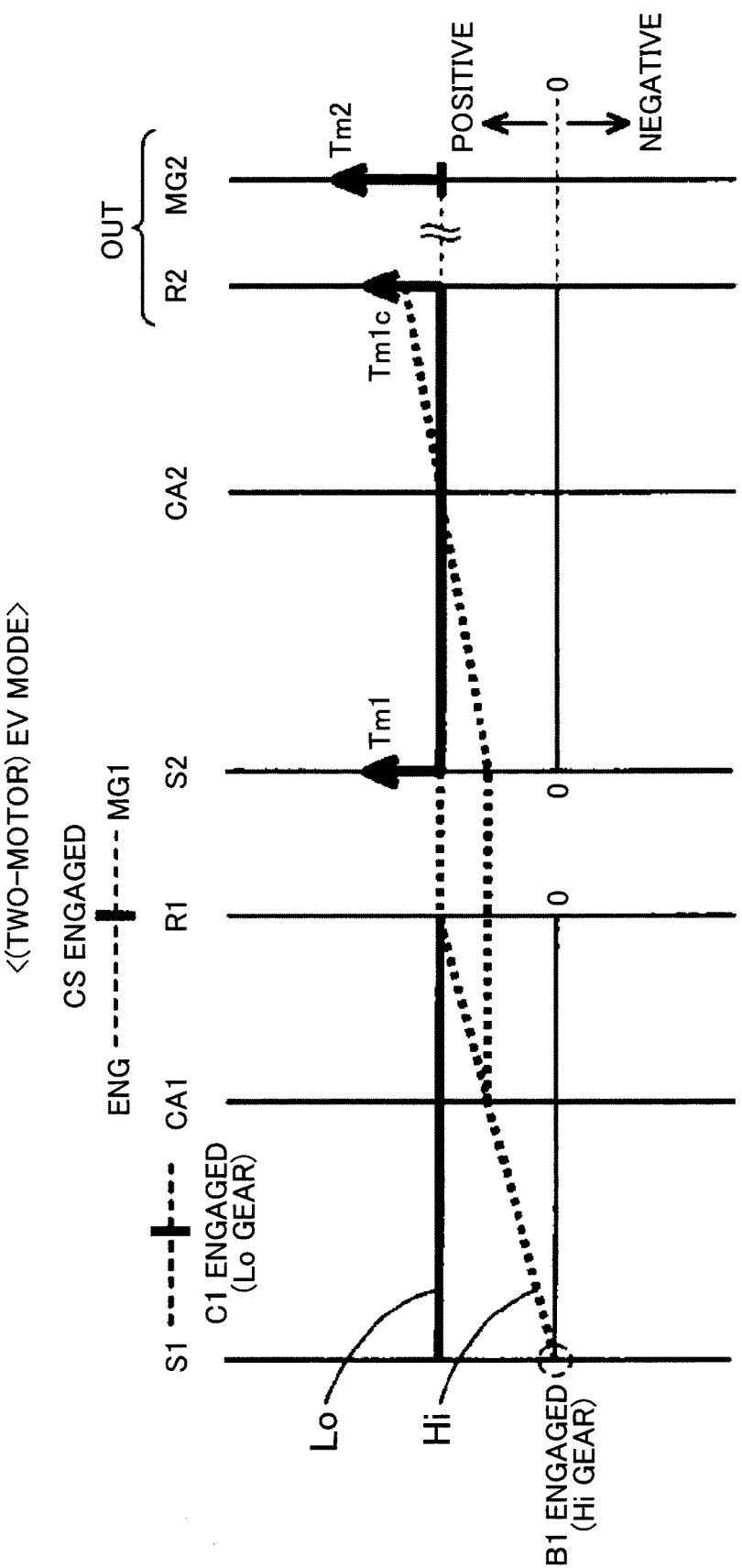
FIG. 17 is a nomograph for illustrating operations of E4 line and E5 line among the drive modes according to the alternative embodiment shown in FIG. 16.

FIG. 17 is a nomograph for illustrating the operations of E4 and E5 lines in FIG. 16. The controlled status in two-motor EV mode will be described with reference to FIG. 17. FIG. 17 illustrates the case where the vehicle is traveling forward in the low gear position Lo (see the continuous common lines shown in FIG. 17) and the case where the vehicle is traveling in the high gear position Hi (see the dashed common lines shown in FIG. 17). For the sake of convenience of description, it is assumed that the rotation speed of the ring gear R1 is the same either when the vehicle is traveling forward in the low gear position Lo or when the vehicle is traveling forward in the high gear position Hi.

When the low gear position Lo is established in two-motor EV mode (E5 line in FIG. 16), the controller 100 engages the clutch C1 and the clutch CS and releases the brake B1. Therefore, the rotating elements (the sun gear S1, the carrier CA1 and the ring gear R1) of the transmission unit 40 rotate integrally with one another. When the clutch CS is engaged, the carrier CA1 of the transmission unit 40 and the sun gear S2 of the differential unit 50 rotate integrally with each other. Thus, all the rotating elements of the transmission unit 40 and differential unit 50 rotate integrally at the same rotation speed. Therefore, when the first MG torque Tm1 is generated in the positive rotation direction by the first MG 20 together with the second MG 30, it is possible to cause the hybrid vehicle 1 to travel by using both the motors. Because the engine 10 is not autonomously driven in EV mode, the engine 10 is in a driven state where the engine 10 is driven by the torque of both the first MG 20 and the second MG 30. Therefore, it is desirable that the open/close timing of each valve be operated such that resistance during rotation of the engine reduces.

The first MG transmission torque Tm1c transmitted to the ring gear R2 is transmitted from the counter drive gear 51 to the counter shaft 70, and acts as the driving force of the hybrid vehicle 1. At the same time, the second MG torque Tm2 is transmitted from the reduction gear 32 to the counter shaft 70, and acts as the driving force of the hybrid vehicle 1. That is, when the low gear position Lo is established in two-motor EV mode, the hybrid vehicle 1 travels by using the second MG torque Tm2 and the first MG torque Tm1 transmitted to the ring gear R2.

On the other hand, when the high gear position Hi is established in two-motor EV mode (E4 line in FIG. 16), the controller 100 engages the brake B1 and the clutch CS and releases the clutch C1. Because the brake B1 is engaged, rotation of the sun gear S1 is restricted.

Because the clutch CS is engaged, the carrier CA1 of the transmission unit 40 and the sun gear S2 of the differential unit 50 rotate integrally with each other. Therefore, the rotation speed of the sun gear S2 is equal to the rotation speed of the engine 10.

Figure 18:
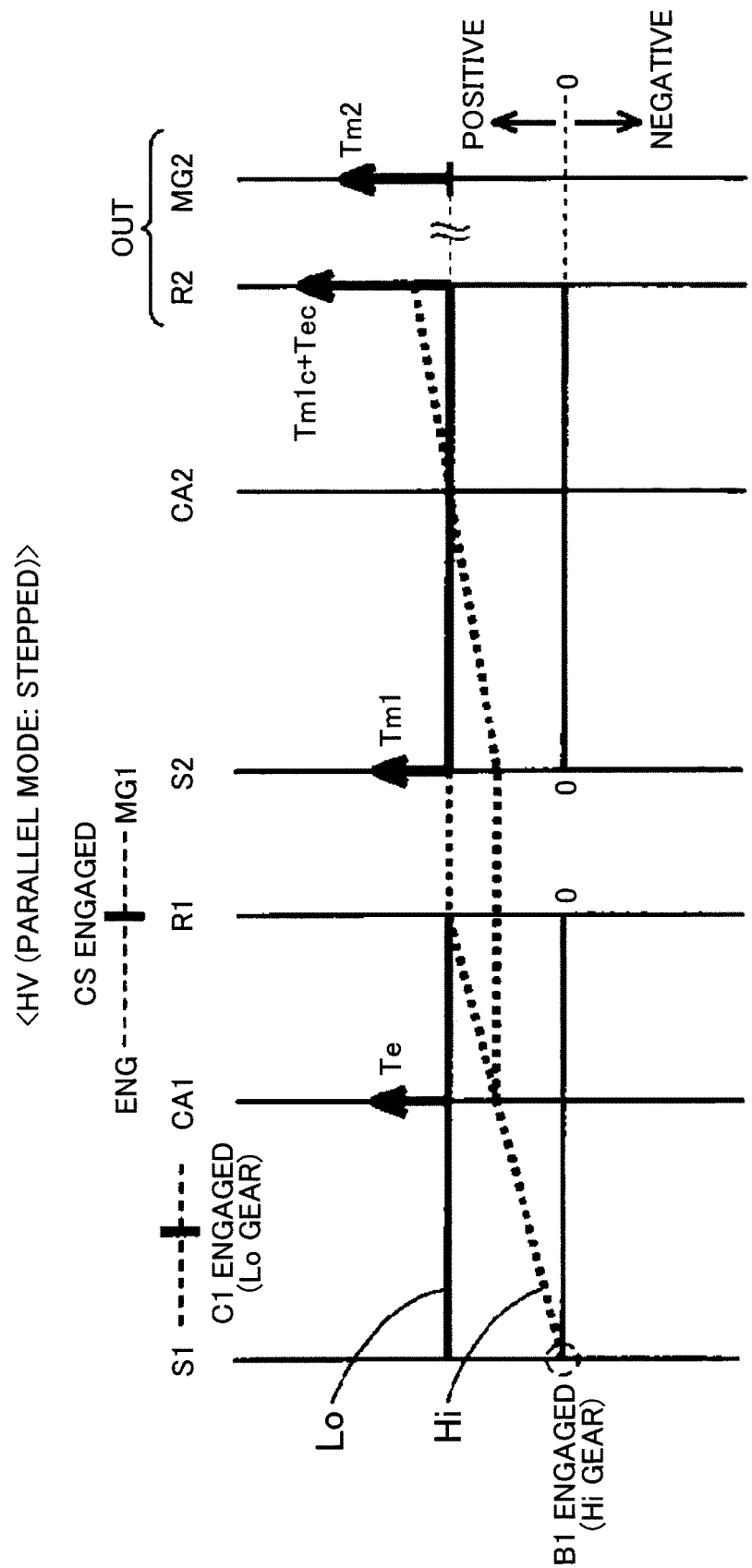
FIG. 18 is a nomograph for illustrating operations of H6 line to H8 line among the drive modes according to the alternative embodiment shown in FIG. 16.

FIG. 18 is a nomograph for illustrating the operations of H6 to H9 lines in FIG. 16. The controlled status in two-motor HV (parallel: stepped) mode will be described with reference to FIG. 18. FIG. 18 illustrates the case where the vehicle is traveling forward in the low gear position Lo (see the continuous common lines shown in FIG. 18) and the case where the vehicle is traveling in the high gear position Hi (see the dashed common lines shown in FIG. 18).

As is apparent from the comparison between FIG. 17 and FIG. 18, in two-motor HV (parallel: stepped) mode, the engine 10 is autonomously driven, so the engine torque Te is applied to the carrier CA1 shown in FIG. 18. Therefore, the engine torque Te is also added to the ring gear R2. The remaining points of the nomograph shown in FIG. 18 are the same as those of FIG. 17, so the description will not be repeated.

In two-motor HV (parallel: stepped) mode, the engine torque Te, the first MG torque Tm1 and the second MG torque Tm2 all are allowed to be used for the forward rotation torque of the drive wheels, so it is particularly effective when a large torque is required of the drive wheels.

The controlled status in one-motor HV (parallel: stepped) mode corresponds to the case where Tm1=0 in FIG. 18.

Figure 19:
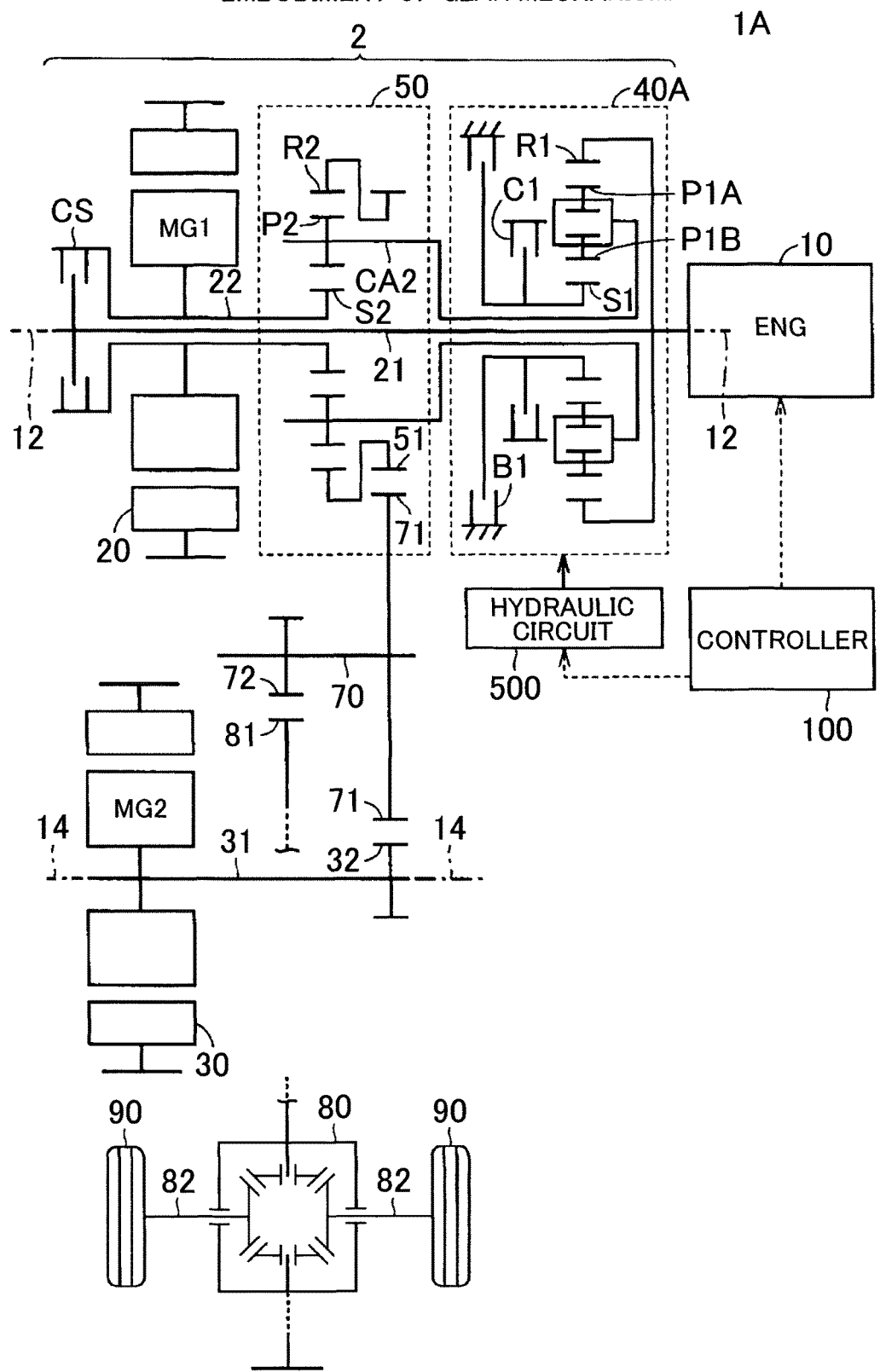
FIG. 19 is a view that shows a first alternative embodiment of the gear mechanism of the hybrid vehicle shown in FIG. 1.

Next, an alternative embodiment of the gear mechanism will be described. FIG. 19 shows a first alternative embodiment of the gear mechanism of the hybrid vehicle in FIG. 1. As shown in FIG. 19, in a hybrid vehicle 1A according to the present alternative embodiment, a transmission unit 40A includes a double-pinion-type planetary gear mechanism, the clutch C1 and the brake B1. The double-pinion-type planetary gear mechanism includes the sun gear S1, pinions P1A, P1B, the ring gear R1 and the carrier CA1.

With such a configuration, it is possible to set a larger gear ratio width with mountability equivalent to the transmission unit 40 including the single-pinion-type planetary gear mechanism.

Figure 20:
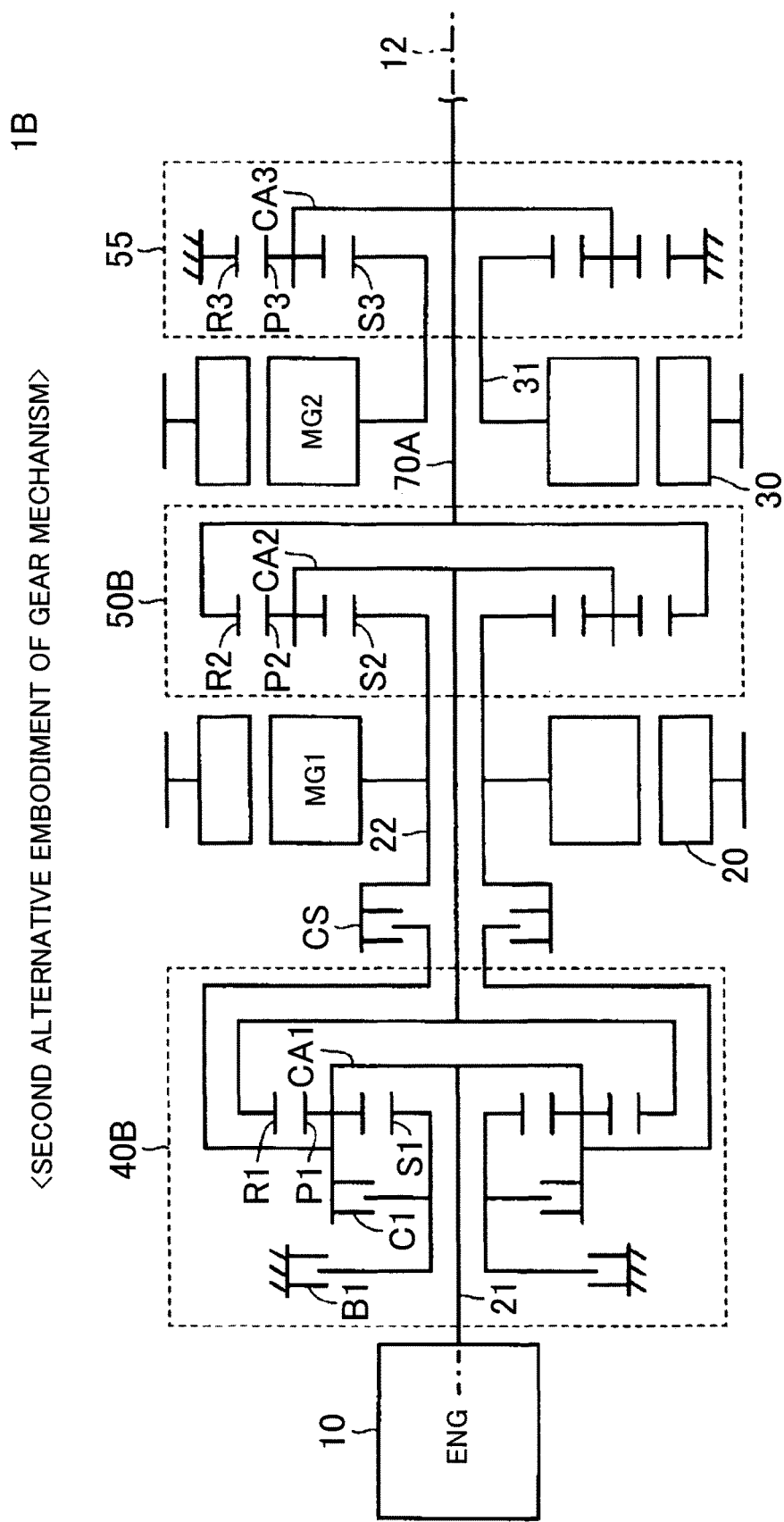
FIG. 20 is a view that shows a second alternative embodiment of the gear mechanism of the hybrid vehicle shown in FIG. 1.

FIG. 20 is a view that shows a second alternative embodiment of the gear mechanism of the hybrid vehicle in FIG. 1. As shown in FIG. 20, in a hybrid vehicle 1B according to the present alternative embodiment, the hybrid vehicle is a front-engine rear-drive (FR) hybrid vehicle that travels by using the power of at least any one of the engine 10, the first MG 20 and the second MG 30.

The first MG 20 and the second MG 30 are provided along the first axis 12 coaxial with the crankshaft of the engine 10. A transmission unit 40B, a differential unit 50B, the clutch CS and a reduction unit 55 are further provided along the first axis 12. The transmission unit 40B, the clutch CS, the first MG 20, the differential unit 50B, the second MG 30 and the reduction unit 55 are arranged from the side close to the engine 10 in the stated order.

The first MG 20 is provided such that power from the engine 10 is inputable to the first MG 20. More specifically, the input shaft 21 is connected to the crankshaft of the engine 10. The carrier CA1 of the transmission unit 40B is connected to the input shaft 21, and rotates integrally with the input shaft 21. The carrier CA1 of the transmission unit 40B is connected to the rotary shaft 22 of the first MG 20 via the clutch CS.

The clutch CS is provided in the power transmission path from the engine 10 to the first MG 20. The clutch CS is a hydraulic friction engagement element that is able to couple the rotary shaft 22 of the first MG 20 to the carrier CA1 of the transmission unit 40B that rotates integrally with the input shaft 21. When the clutch CS is placed in the engaged state, the carrier CA1 and the rotary shaft 22 are coupled to each other, so transmission of power from the engine 10 to the first MG 20 is allowed. When the clutch CS is placed in the released state, coupling of the carrier CA1 and the rotary shaft 22 is released, so transmission of power from the engine 10 to the first MG 20 is interrupted.

An output shaft 70A extends along the first axis 12. The output shaft 70A is connected to the ring gear R2 of the differential unit 50B, and rotates integrally with the ring gear R2.

The reduction unit 55 includes a single-pinion-type planetary gear mechanism including a sun gear S3, pinions P3, a ring gear R3 and a carrier CA3. The rotary shaft 31 of the second MG 30 is connected to the sun gear S3. The rotary shaft 31 of the second MG 30 rotates integrally with the sun gear S3. The ring gear R3 is fixed to the case body of the drive system. The output shaft 70A is connected to the carrier CA3. The output shaft 70A rotates integrally with the carrier CA3. The rotation of the output shaft 70A is transmitted to right and left drive shafts (not shown) via a differential unit (not shown).

In the present alternative embodiment, installation of the drive system on the FR hybrid vehicle is made possible by arranging the output shaft 70A coaxially with the crankshaft of the engine 10.

The embodiment described above is illustrative and not restrictive in all respects. The scope of the invention is defined by the appended claims rather than the above description. The scope of the invention is intended to encompass all modifications within the scope of the appended claims and equivalents thereof.

What is claimed is:

1. A hybrid vehicle comprising:
an internal combustion engine;
a first rotary electric machine;
a second rotary electric machine configured to output power to a drive wheel;
a power transmission unit including an input element and an output element, the input element being configured to receive power from the internal combustion engine, the output element being configured to output power input to the input element, and the power transmission unit being configured to switch between a non-neutral state where power is transmitted between the input element and the output element and a neutral state where power is not transmitted between the input element and the output element;
a differential unit including a first rotating element, a second rotating element and a third rotating element, the first rotating element being connected to the first rotary electric machine, the second rotating element being connected to the second rotary electric machine and the drive wheel, the third rotating element being connected to the output element, and the differential unit being configured such that, when rotation speeds of any two of the first rotating element, the second rotating element and the third rotating element are determined, a rotation speed of the remaining one of the first rotating element, the second rotating element and the third rotating element is determined;
a clutch configured to switch between an engaged state where power is transmitted from the internal combustion engine to the first rotary electric machine and a released state where transmission of power from the internal combustion engine to the first rotary electric machine is interrupted, power from the internal combustion engine being transmitted to the first rotary electric machine though at least one of a first path or a second path,
the first path being a path through which power is transmitted from the internal combustion engine to the first rotary electric machine via the power transmission unit and the differential unit,
the second path being a path through which power is transmitted from the internal combustion engine to the first rotary electric machine, being different from the first path, and not including the differential unit, and
the clutch being provided in the second path; and
a controller configured to, at the time of switching from series-parallel mode to series mode, after starting to control the power transmission unit such that the power transmission unit is placed in the neutral state, control the first rotary electric machine such that a first rotation speed of the first rotary electric machine and a second rotation speed of the internal combustion engine are synchronous with each other, the series-parallel mode being a mode in which the clutch is in the released state and the power transmission unit is in the non-neutral state, the series mode being a mode in which the clutch is in the engaged state and the power transmission unit is in the neutral state.

2. The hybrid vehicle according to claim 1, wherein the controller is configured to, by the time the clutch is placed in the engaged state, control at least any one of the first rotary electric machine and the second rotary electric machine such that torque fluctuations that occur as a result of placing the clutch in the engaged state reduce.

3. The hybrid vehicle according to claim 1, wherein the controller is configured to control the clutch such that the clutch switches from the released state to the engaged state after synchronization of the first rotation speed with the second rotation speed has completed.

4. The hybrid vehicle according to claim 1, wherein the controller is configured to, at the time of switching from the series-parallel mode to the series mode, place the power transmission unit in the neutral state, and reduce an output torque of the internal combustion engine.

* * * * *